(12) United States Patent
Vacanti et al.

(10) Patent No.: US 10,871,457 B2
(45) Date of Patent: Dec. 22, 2020

(54) DETERMINING MATERIAL CATEGORY BASED ON THE POLARIZATION OF RECEIVED SIGNALS

(71) Applicant: Honeywell International Inc., Morris Plains, NJ (US)

(72) Inventors: David C. Vacanti, Renton, WA (US); Marc M. Pos, Duvall, WA (US)

(73) Assignee: Honeywell International Inc., Charlotte, NC (US)

( * ) Notice: Subject to any disclaimer, the term of this patent is extended or adjusted under 35 U.S.C. 154(b) by 195 days.

(21) Appl. No.: 16/116,486

(22) Filed: Aug. 29, 2018

(65) Prior Publication Data

US 2020/0072764 A1 Mar. 5, 2020

(51) Int. Cl.
*G01N 22/00* (2006.01)
*G01S 7/02* (2006.01)
*G01S 7/06* (2006.01)
*G01S 13/931* (2020.01)

(52) U.S. Cl.
CPC .............. *G01N 22/00* (2013.01); *G01S 7/026* (2013.01); *G01S 7/062* (2013.01); *G01S 13/931* (2013.01)

(58) Field of Classification Search
CPC .......... G01S 7/026; G01S 7/411; G01S 7/024; G01S 7/025; H01Q 21/24; H01Q 13/0241; H01Q 15/244; H01Q 15/246; H01Q 9/0428; H01Q 15/24
See application file for complete search history.

(56) References Cited

U.S. PATENT DOCUMENTS

| 4,156,874 | A | 5/1979 | Kopis |
| 6,243,036 | B1 * | 6/2001 | Chadwick ............... G01S 7/025 |
| | | | 342/175 |
| 6,734,807 | B2 | 5/2004 | King |
| 7,639,183 | B2 | 12/2009 | Teshirogi et al. |
| 8,264,398 | B2 | 9/2012 | Kamo |

(Continued)

FOREIGN PATENT DOCUMENTS

WO 2018/154066 A1 8/2018

OTHER PUBLICATIONS

Tan et al., "Theoretical Studies of Differential Propagation Phase Shift in Meteorological Polarization Diversity Radars at Centimeter Wavelengths," ICAP 91., Seventh International Conference on (IEE) Antennas and Propagation, London, UK, Jan. 1, 1991, 4 pp.

(Continued)

*Primary Examiner* — Timothy X Pham
(74) *Attorney, Agent, or Firm* — Shumaker & Sieffert, P.A.

(57) ABSTRACT

In some examples, a radar device is configured to detect an object, where the radar device includes transceiver circuitry configured to transmit radar signals having a first polarization type towards the object, receive radar signals having the first polarization type reflected from the object, and receive radar signals having a second polarization type reflected from the object, the second polarization type being different than the first polarization type. The radar device also includes processing circuitry configured to determine a material category of the object based on the radar signals having the first polarization type reflected from the object and the radar signals having the second polarization type reflected from the object.

20 Claims, 8 Drawing Sheets

(56) References Cited

U.S. PATENT DOCUMENTS

| | | | |
|---|---|---|---|
| 8,547,279 B2 | 10/2013 | Tokuhiro et al. | |
| 2004/0248525 A1 | 12/2004 | Prime | |
| 2007/0143036 A1* | 6/2007 | Stratis | G01N 23/00 |
| | | | 702/28 |
| 2011/0102238 A1* | 5/2011 | Kamo | G01S 7/025 |
| | | | 342/70 |
| 2012/0268602 A1* | 10/2012 | Hirai | G06T 7/12 |
| | | | 348/148 |
| 2013/0113649 A1 | 5/2013 | Trishaun et al. | |
| 2013/0148326 A1* | 6/2013 | Goldfain | G01N 21/4795 |
| | | | 362/19 |
| 2014/0159937 A1 | 6/2014 | Beadle et al. | |
| 2014/0368373 A1 | 12/2014 | Crain et al. | |
| 2015/0176806 A1* | 6/2015 | Goldfain | A61B 5/0075 |
| | | | 250/208.1 |
| 2015/0192668 A1 | 7/2015 | Mckitterick | |
| 2015/0237183 A1* | 8/2015 | Novet | H04M 1/72569 |
| | | | 455/556.1 |
| 2016/0025839 A1 | 1/2016 | Trummer | |
| 2017/0168156 A1 | 6/2017 | Hoare et al. | |
| 2017/0343667 A1 | 11/2017 | Vacanti et al. | |
| 2018/0024226 A1 | 1/2018 | Izadian | |
| 2018/0120413 A1 | 5/2018 | Stoeckle et al. | |
| 2019/0271765 A1* | 9/2019 | Ben Khadhra | G01S 7/412 |
| 2020/0025868 A1 | 1/2020 | Trummer et al. | |

OTHER PUBLICATIONS

Kishk et al., "Comparison Between Experimental and Numerical Results of Electromagnetic Scattering From Lossy Dielectric Objects," 1987 Antennas and Propagation Society International Symposium, Jun. 19, 1987, 4 pp.

Skolnik, "Extraction of Information and Waveform Design," Chapter 11, Introduction to Radar Systems, Second Edition, McGraw-Hill Book Company, Jan. 1, 1980, pp. 399-440.

Schimpf, "Polarimetric Target/Clutter Discrimination," Third International Workshop on Radar Polarimetry, [3EMES Journees Internationales De La Polarimetrie Radar], vol. 2, Mar. 23, 1995, pp. 402-412.

Extended Search Report from counterpart European Application No. 19192716.9, dated Jan. 20, 2020, 12 pp.

Bystrov et al., "Automotive System for Remote Surface Classification," MDPI, Sensors, Apr. 1, 2017, 18 pp.

Hamberger et al., "A Planar Dual-Polarized Microstrip 1-D-Beamforming Antenna Array for the 24-GHz Band," IEEE Transactions on Antennas and Propagation, vol. 65, No. 1, Jan. 2017, 8 pp.

Trummer et al., "A Polarimetric 76-79 GHz Radar-Frontend for Target Classification in Automotive Use," Proceedings of the 13th European Radar Conference, Oct. 5-7, 2016, 4 pp.

Zetik et al., "Ultra-Wideband Radio Technologies for Communications, Localization and Sensor Applications," ResearchGate, Cooperative Localization and Object Recognition in Autonomous UWB Sensor Networks, INTECH, Jan. 2013, 63 pp.

U.S. Appl. No. 15/474,804, by Honeywell International Inc. (Inventors: David C. Vacanti et al.), filed Mar. 30, 2017.

U.S. Appl. No. 15/808,135, by Honeywell International Inc. (Inventors: Katherine Goossen et al.), filed Nov. 9, 2017.

U.S. Appl. No. 15/677,844, by Honeywell International Inc. (Inventors: David C. Vacanti et al.), filed Aug. 15, 2017.

U.S. Appl. No. 15/960,214, by Honeywell International Inc. (Inventors: Marc M. Pos et al.), filed Apr. 23, 2018.

Response to Extended Search Report dated Jan. 20, 2020, from counterpart European Application No. 19192716.9, filed Apr. 28, 2020, 27 pp.

\* cited by examiner

DETERMINING MATERIAL CATEGORY
BASED ON THE POLARIZATION OF
RECEIVED SIGNALS

TECHNICAL FIELD

This disclosure relates to radar systems.

BACKGROUND

A radar system can transmit signals and detect objects based on reflections of the transmitted signals received by the radar system. Current vehicle radar sensors attempt to distinguish target types via high angular and range resolution. These methods produce radar data "point clouds" for a processor to parse to determine the type of object in the path of the vehicle. Millions of dollars have been invested in light detection and ranging (LIDAR) systems that can provide still finer angle and range resolution so as to make the LIDAR images appear closer to a photograph image for object recognition. These substantial investments underscore the difficulty in object detection for vehicles.

While these methods work to some degree, they have significant failure modes. For example, it is difficult to write algorithms that can correctly amalgamate a subset of a point cloud data set and associate those points with an object of a particular type. This difficulty exists in part because the material category does not impart any recognizable change into the reflected signal that the processor can use to determine the category of material for an object. Current object-detection schemes use near-photographic resolution and photograph-based object recognition to determine the nature of an object being observed by the radar or LIDAR sensor. But these methods may not provide adequate data for determinations of material categories in vehicle radar applications.

SUMMARY

In general, this disclosure relates to systems, devices, and techniques for detecting an object and determining a category of material for the object. A radar device includes transceiver circuitry that can transmit radar signals with a first polarization type (e.g., right-hand circularly polarized or left-hand circularly polarized). The transceiver circuitry can receive radar signals with the first polarization type and radar signals with a second polarization type. Based on the received radar signals having the first polarization type and the received radar signals having the second polarization type, processing circuitry can determine a material category for the object. The determination of the material category may be based on, for example, a power ratio of the two polarization types and/or a phase relationship between the two polarization types.

In some examples, a radar device is configured to detect an object, where the radar device includes transceiver circuitry configured to transmit radar signals having a first polarization type towards the object, receive radar signals having the first polarization type reflected from the object, and receive radar signals having a second polarization type reflected from the object, the second polarization type being different than the first polarization type. The radar device also includes processing circuitry configured to determine a material category of the object based on the radar signals having the first polarization type reflected from the object and the radar signals having the second polarization type reflected from the object.

In some examples, a device includes a computer-readable medium having executable instructions stored thereon, configured to be executable by processing circuitry for causing the processing circuitry to cause transceiver circuitry to transmit radar signals having a first polarization type towards an object. The instructions are further configured to be executable by the processing circuitry to cause the transceiver circuitry to receive radar signals having the first polarization type reflected from the object and to cause the transceiver circuitry to receive radar signals having a second polarization type reflected from the object, the second polarization type being different than the first polarization type. The instructions are further configured to be executable by the processing circuitry to determine a material category of the object based on the radar signals having the first polarization type reflected from the object and the radar signals having the second polarization type reflected from the object.

In some examples, a method for detecting an object comprises causing transceiver circuitry to transmit radar signals having a first polarization type towards the object and causing the transceiver circuitry to receive radar signals having the first polarization type reflected from the object. The method further includes causing the transceiver circuitry to receive radar signals having a second polarization type reflected from the object, the second polarization type being different than the first polarization type. The method includes determining a material category of the object based on the radar signals having the first polarization type reflected from the object and the radar signals having the second polarization type reflected from the object.

The details of one or more examples of the disclosure are set forth in the accompanying drawings and the description below. Other features, objects, and advantages will be apparent from the description, drawings, and claims.

DETAILED DESCRIPTION

Figure 1:
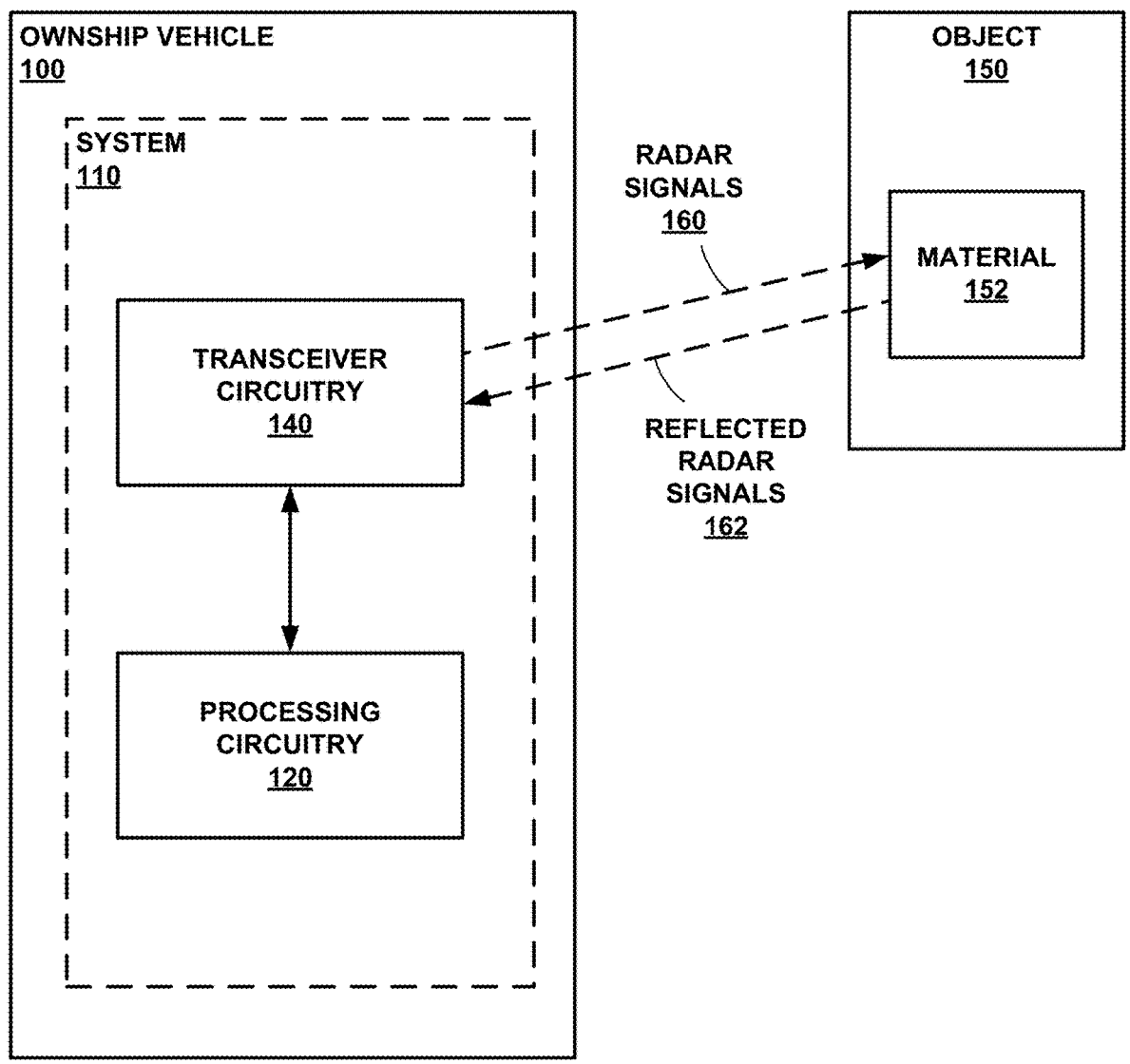
FIG. 1 is a conceptual block diagram of an example system including processing circuitry and a transceiver, in accordance with some examples of this disclosure.

This disclosure describes radar devices, methods, and techniques for determining material categories based on received radar signals with multiple polarization types. A radar device can receive and process radar signals with multiple polarization types even if the radar device transmits radar signals with only one polarization type. For example, the radar device may transmit radar signals with a first type of polarization, such as right-hand circular polarization (RHCP), and receive radar signals with multiple types of polarization, such as RHCP and left-hand circular polarization (LHCP).

The radar signals transmitted by the radar device may reflect off the material of an object. The radar signals can repolarize as the radar signals reflect off the material of the object. For example, if the object is a tree, the material may be the surface of a leaf. The radar signals reflected off the surface of the leaf may have polarization types that indicate that the object includes material in the category of vegetation. In some examples, vegetation material types may cause a balanced power ratio of polarization types for reflected radar signals (e.g., close to a one-to-one ratio). In contrast, the surface of an object with material in the category of metal, such as the surface of a street sign, may cause a less balanced power ratio of polarization types for reflected radar signals.

A radar device of this disclosure may improve navigation and collision avoidance for self-driving cars and other vehicles, such as aircraft, marine vehicles, drones, and so on. A phased-array radar device can provide multiple advantages to automotive and other vehicle collision avoidance systems when enhanced with multiple polarization processing on the receive side. For example, dual circular polarization radar devices can provide vivid indications of material type and categories. The processing circuitry of a radar device can use the determination of a material category for predicting and avoiding potential collisions.

A radar device can include an antenna configured to transmit in one polarization type and to receive multiple polarization types simultaneously. A single polarization on the transmit side may have less complex circuitry, as compared to a dual polarization transmission radar. The radar device can use the ratio of signal power received in a channel for the first polarization type and a channel for the second polarization type to determine the material category for the reflecting surface in each radar voxel (azimuth, elevation, and range). The radar device may be configured to determine a phase relationship between the polarization hardware channels and determine further information about an object based on the phase relationship.

Further, power and or phase relationships are evaluated within 3D pixels (azimuth, elevation and range) or voxel that are subsequently understood as portions of complete 3D images. The processing circuitry can determine a material type from an overall small collection of voxel elements. Therefore, the method relies on a dual polarized radar that has fine angle resolution such as monopulse angle measurement capability in both azimuth and elevation planes in addition to fine range resolution.

The processing circuitry of the radar device can apply an algorithm to collect power and phase ratios associated with a category of objects. The processing circuitry can use an object-type recognition method such as a classical Bayesian classifier to create a non-linear boundary around voxels with polarization ratios that are associated with a category of objects such as people and animals, buildings, signage, street materials (e.g., road surface, curbs, or sidewalks). Once this training has taken place, the processing circuitry can assign a pseudo "color" to each material or object class type (e.g., for display purposes) that allows a radar signal processor to determine object type.

The processing circuitry may be configured to create a three-dimensional array of voxels that represents the space in the path of the radar signals. Each voxel represents a portion of three-dimensional space that the processing circuitry can define in terms of azimuth, elevation, and range. Based on the received radar signals of multiple polarization types, the processing circuitry may be configured to determine a material category (e.g., a "color") for each voxel or a small collection of voxels in a three-dimensional space. The processing circuitry can evaluate the angular and range extent of an object that is associated with the same "color" voxels. The processing circuitry may determine the location, size, and extent of an object based on a set of adjacent voxels that include the same material category or similar material categories. The processing circuitry can determine the type of object based on the likelihood that the dimensions of an object are reasonable. For example, the processing circuitry could determine that an object described by a collection of voxels of a common material type with the dimensions of ten feet by twenty feet is not a human.

The processing circuitry of the radar device may perform monopulse angle measurements of the objects in the scene or volume of space in order to create a voxel array with fine range resolution. The combination of fine angle resolution, fine range resolution, and dual RHCP/LHCP measurement can be used by the processing circuitry to classify objects according to basic types (e.g., building, people, animal, or road materials). The processing circuitry may then be configured to report the object type and three-dimensional location to a navigation system for collision avoidance or other navigation decision making.

The techniques of this disclosure may be useful for autonomous vehicles, remote-controlled vehicles, and/or operator-occupied vehicles. For example, an autonomous vehicle can use a radar device that determines material categories to determine whether an object is a pedestrian or a street sign. A collision avoidance system onboard the autonomous vehicle can track the movement of pedestrians and other mobile objects (e.g., animals and other vehicles). A determination of material category can improve the efficiency of the collision avoidance system because the collision avoidance system can refrain from tracking and predicting the movements of immobile objects, such as street signs.

In addition, the radar device may be configured to distinguish organic material in front of nonorganic material, such as a person in front of a wall. The radar device may be configured to perform this polarization analysis in combination with Doppler processing to identify persons and create tracks of the movement of each person. The processing circuitry of the radar device may also be configured to adjust a scanning strategy to revisit areas with organic material surrounded by nonorganic material more frequently to watch for movement of the organic material (e.g., persons or other animals). For example, the processing circuitry can be configured to "anticipate," or detect evidence of, a person walking into a roadway.

FIG. 1 is a conceptual block diagram of an example system 110 including processing circuitry 120 and transceiver circuitry 140, in accordance with some examples of this disclosure. System 110 may be configured to mount on ownship vehicle 100, which can be any mobile object such as an aerial vehicle, a land vehicle, or a marine vehicle. Ownship vehicle 100 can be an aircraft such as a helicopter or a weather balloon. Ownship vehicle 100 can also a space vehicle such as a satellite or spaceship. In yet other examples, ownship vehicle 100 may include a land vehicle such as an automobile or a water vehicle such as a ship or a submarine. Ownship vehicle 100 may be a manned vehicle or an unmanned vehicle, such as a drone, a remote-control vehicle, a ballistic vehicle, or any suitable vehicle without any pilot or crew on board.

System 110 is an example of a radar device, as described herein, and may include processing circuitry 120 and transceiver circuitry 140. System 110 may also include other components not depicted in FIG. 1, such as a memory device, a positioning device configured to receive positioning signals (e.g., positioning device 260), and/or one or more sensors configured to detect the location and/or velocity of ownship vehicle 100. System 110 can also include or be connected to a sense-and-avoid system, a collision avoidance system, and/or any other equipment, hardware, or software that uses position data, velocity data, and object type data relating to object 150. System 210 is a more detailed example of system 110 that includes several optional components.

Processing circuitry 120, as well as other processors, processing circuitry, controllers, control circuitry, and the like, described herein, may include one or more processors. Processing circuitry 120 may include any combination of integrated circuitry, discrete logic circuity, analog circuitry, such as one or more microprocessors, digital signal processors (DSPs), application specific integrated circuits (ASICs), or field-programmable gate arrays (FPGAs). In some examples, processing circuitry 120 may include multiple components, such as any combination of one or more microprocessors, one or more DSPs, one or more ASICs, or one or more FPGAs, as well as other discrete or integrated logic circuitry, and/or analog circuitry. Processing circuitry 120 may also include a hybrid processing systems known as Multi-Processor System on a Chip (MPSOC) that is a single component made up of ARM (Advanced reduced instruction set computing (RISC) Machine) Core Processors, FPGA components, and common shared memory. Examples of MPSOC devices are made by Xilinx, Inc. of San Jose, Calif.

Processing circuitry 120 may be configured to determine the location and velocity of object 150 based on a beam focused on object 150. Processing circuitry 120 may use digital-beam-forming techniques such as complex weighting based on phase shifts and/or amplitude shifts. Additionally or alternatively, processing circuitry 120 may be configured to apply phase shift beam steering on receive at intermediate frequencies below the transmit frequency and above the final baseband signals.

Processing circuitry 120 may be configured to determine a velocity of object 150 based on a change in the frequency of reflected radar signals 162 from the frequency of radar signals 160 (e.g., the Doppler frequency). Processing circuitry 120 may create a three-dimensional representation of the space around system 110. The three-dimensional representation may include cells or voxels defined by azimuth, elevation, and range. Processing circuitry 120 can assign, to each voxel, values indicating whether the voxel is occupied and the material category, if any, of the object in the voxel.

At long ranges, a single voxel may contain all of object 150 even if object 150 is relatively large. At close ranges, several voxels will describe object 150 if object 150 has relatively large angular extent. For that reason, processing circuitry 120 can use image processing methods to rapidly combine or isolate voxels of a common material type based on range to object 150 and angular extent of object 150 at that range. At close ranges, where multiple voxels will describe object 150, processing circuitry 120 may be configured to use image processing methods to measure or determine where object 150 begins and ends based on the category of material associated with each voxel.

Processing circuitry 120 may be configured to control transceiver circuitry 140 by causing transceiver circuitry 140 to transmit radar signals 160. Processing circuitry 120 may include an MPSOC, random access memory (RAM), and/or nonvolatile memory configured to store data relating to object 150 and ownship vehicle 100. Processing circuitry 120 may be configured to control the direction, time of transmission, and order of transmission of radar signals 160. Processing circuitry 120 may be further configured to analyze the characteristics of reflected radar signals 162, including the power, amplitude, frequency, time of arrival, and angle of arrival of reflected radar signals 162 to determine the location and velocity of object 150.

In some examples, processing circuitry 120 may be configured to determine the direction of travel and velocity of the object based on the difference in frequency between a transmitted signal and a returned signal according to the Doppler effect. By Doppler processing, processing circuitry 120 may differentiate object 150 from mainlobe clutter. In some examples, processing circuitry 120 may be configured to determine the size of the object based on the angular and range extent of adjacent voxels of common material type in the returned signals. In some examples, processing circuitry 120 may be configured to determine the angle of object 150 relative to the antenna array of transceiver circuitry 140 based on the phase shift in the returned signals received by the antenna array.

System 110 may be configured to use monopulse methods that measure phase between specific subarrays of receive elements of transceiver circuitry 140. Transceiver circuitry 140 may include subarrays of receive element arranged in quadrants. For example, standard automobile radars can measure phase in one plane and not both azimuth and elevation. A radar device configured to measure phase in two direction may have a significant advantage over single-plane radars.

Transceiver circuitry 140 includes an antenna configured to transmit radar signals 160 and receive reflected radar signals 162. In some examples, transceiver circuitry 140 may include an array of transmit elements configured to transmit radar signals 160 as a single beam. The transmit elements may transmit radar signals 160 in a continuous wave. Transceiver circuitry 140 may also include an array of receive elements configured to receive reflected radar signals 162. System 110 may include a means for electrically isolating the transmit elements and the receive elements, such as an electronic bandgap (EBG) isolator (see FIG. 3). Transceiver circuitry 140 may include microstrip antenna(s) etched on a printed circuit board (PCB). Transceiver circuitry 140 can have patch elements(s) or discrete element(s).

Transceiver circuitry 140 is configured to transmit radar signals 160 having a first polarization type and to receive reflected radar signals 162 having first and second polarization types. Examples of polarization types include RHCP and LHCP, directions of elliptical polarization, and linear polarizations such as vertical and horizontal. Dual circular polarization may have favorable characteristics because the material characteristics of object 150 may repolarize dual circular polarized radar signals 160. Transceiver circuitry 140 may be configured to transmit radar signals with only one polarization. Transmitting radar signals with a single polarization may require fewer hardware components and lower cost, as compared to transceiver circuitry that can transmit dual polarization.

Object 150 may be any stationary object or mobile object such as another vehicle, which may be manned or unmanned. Object 150 may be a weather balloon or an animal such as a human, ground-based animal, or a flying bird. Object 150 may also be part of terrain (e.g., ground or body of water), a stationary object (e.g., a sign, a metal or plastic pole, a rock, a tree, or a plant), or a weather object (e.g., a water droplet). Object 150 can be a road material, such as asphalt or concrete roadway, or a natural ground material, such as dirt, soil, sand, gravel, or rocks. Object 150 can also be a building material, such as concrete, glass, wood, metal, plastic, vinyl, stucco, and/or masonry.

In accordance with the techniques of this disclosure, processing circuitry 120 is configured to determine a category for material 152 of object 150 based on the polarization characteristics of reflected radar signals 162. The category of material 152 may have an effect on the polarization type of reflected radar signals 162. For example, some categories of materials, such as materials that are generally flat with relatively high electrical conductivity, may cause the polarization type to change when radar signals 160 reflect off object 150, such that RHCP signals transmitted from transceiver circuitry 140 will return to transceiver circuitry 140 as mostly LHCP signals. Other categories of materials, such as vegetation, humans, and other animals, may cause the polarization type to change when radar signals 160 reflect off object 150, such that RHCP signals transmitted from transceiver circuitry 140 will return to transceiver circuitry 140 as a more even combination of RHCP and LHCP signals.

Radar signals 160 may have a single polarization before reflecting off object 150. When radar signals 160 reflect off object 150, reflected radar signals 162 may have two polarization types. For example, if the category of material 152 is vegetation, the ratio of reflected radar signals 162 with a first polarization type to reflected radar signals 162 with a second polarization type may be close to unity (e.g., one-to-one). If the category of material 152 is metal, the ratio of reflected radar signals 162 with a first polarization type to reflected radar signals 162 with a second polarization type may be farther from unity (e.g., five-to-one or one-to-five). The material category of vegetation may cause approximately half of radar signals 160 to switch polarization types, whereas the material category of metal may cause nearly all of radar signals 160 to switch polarization types.

Processing circuitry 120 may be configured to determine based shape types, such as a flat surface, an inside corner called a dihedral, and a triple inside corner called a retroreflector. Processing circuitry 120 may be able to determine these shapes using dual circular polarized signals. Flat or retro metal reflectors return opposite polarization to the incident and a dihedral returns a co-polarized signature, if these materials are pure metal conductors. Otherwise, these materials will return complex ratios of co-polarized and cross-polarized energy. Each material reflects a complex polarization signature, rather than two separate polarized signals, that the receiver antennas of transceiver circuit 140 can break into two components.

Processing circuitry 120 can determine a category of material 152 by selecting the category of material 152 from a set of material categories. Examples of material categories include vegetation, animals and humans, metal surfaces or conductive surfaces, or low conductivity materials such as concrete and asphalt, wood or masonry that will be combined into one or two general construction material types. Attempts to classify beyond a basic type such as non-conductive street or non-conductive building materials may not be necessary for the radar devices of this disclosure. A radar device with very fine classification of material type (wood, stucco, shingle, hybrid masonry siding, etc.) may require exceptional polarization measurement accuracy (amplitude and phase measurement), an exceptional training and testing program, and very fine angular resolution that is possible only with Synthetic Aperture Radar systems. Each material category is a grouping or class of materials. For example, the material category of metal surfaces can include metal siding on a building, metal roofing on a building, metal street signs, metal exteriors on other vehicles, metal light poles. The material category of metal surfaces can include copper, steel, aluminum, iron, and so on.

In some examples, the shape and conductivity of the surface of object 150 affects the power ratio and the phase relationship of the reflected radar signals 162. Processing circuitry 120 may be configured to use Equation (1) to determine the power ratio of reflected radar signals 162 based on the power of reflected radar signals 162 having a first polarization type and the power of reflected radar signals 162 having a second polarization type. Processing circuitry 120 can use Equation (2) to determine the power of a signal. Processing circuitry 120 may be configured to use Equation (3) to determine the phase relationship between reflected radar signals 162 based on the power of reflected radar signals 162 having a first polarization type and reflected radar signals 162 having a second polarization type, where the phase relationship can be defined by the relative phase shift $\theta$ between voxel N in one polarization channel and the same Voxel N in the second polarization channel, as shown in Equations (1) and (2).

$$\text{Power ratio Per Voxel} = \frac{\text{Power of signals 162 in Voxel } N \text{ having first polarization type}}{\text{Power of signals 162 in Voxel } N \text{ having second polarization type}} \quad (1)$$

$$\text{Power of signals 162} = \quad (2)$$
$$\text{Power of channel 1 in Voxel } N + \text{Power of channel 2 in Voxel } N$$

Processing circuitry 120 may be configured to determine the power of reflected radar signals 162 based on the spectral line of a fast Fourier transform (FFT) used in an FMCW radar to determine the range of object 150. Processing circuitry 120 can coherently combine the spectral power in bin k of channel 1 with the power in the same range bin k of channel 2 (opposite polarization) is the total power received from object 150 in that bin and azimuth and elevation location. The total power of a signal as a function of time, whereas processing circuitry 120 may be configured to evaluate reflected radar signals 162 received by an FMCW transceiver in the frequency domain. Processing circuitry 120 may be configured to employ an FFT to generate the power of a signal in a particular range (e.g., frequency) bin and retain the phase of that spectral line. Processing circuitry 120 may then be configured to compare the phase of the spectral line at range bin k in channel 1 with phase in the same range bin k in channel 2. Processing circuitry 120 may be configured to use the delta phase between the two channels.

Processing circuitry 120 may be configured to determine an object type based on the category of material 152 from one of three, four, five, six, or any other number of generic types. Processing circuitry 120 can base the determination of object type on the number of voxels associated with the category of material 152, which is an indication of the expected potential size of object 150, but processing circuitry 120 may also corroborate this determination with the actual angular and range extent of adjacent voxels that contain a common material type. For example, a material type that is animal or human may be expected to occupy no more than four total voxels at a range of X meters from transceiver circuitry 140, depending on the angular resolution of the voxels. At some greater range, a single voxel may contain a material type of an animal, and at closer ranges eight to ten voxels may contain the material type common to an animal or human. In some examples, system 110 includes a memory device (e.g., memory device 290) configured to store data indicating the characteristics of objects, such as the typical lengths, heights, widths, and velocities of object types.

In some examples, processing circuitry 120 is configured to determine the category of material 152 is a conductive material based on the power ratio for reflected radar signals 162 exceeding a first threshold ratio, such as five decibels, seven decibels, ten decibels, or any other threshold. Processing circuitry 120 may also be configured to determine the category of material 152 is an insulative material based on the power ratio for reflected radar signals 162 being less than a second threshold ratio, such as two decibels, three decibels, four decibels, five decibels, or any other threshold. An insulative material includes vegetation and animals, which have surfaces that can act as a dielectric.

Processing circuitry 120 may be configured to determine the category of material 152 based on more than one set of reflected radar signals 162. The polarization of each set of reflected radar signals 162 may provide evidence to processing circuitry 120 of the category of material 152. Processing circuitry 120 may be configured to integrate multiple sets of reflected radar signals 162 or to detect differences in polarization ratios across multiple sets of reflected radar signals 162. The differences across multiple sets of reflected radar signals 162 may provide evidence, beyond a single set of reflected radar signals 162, of the category of material 152.

Figure 2:
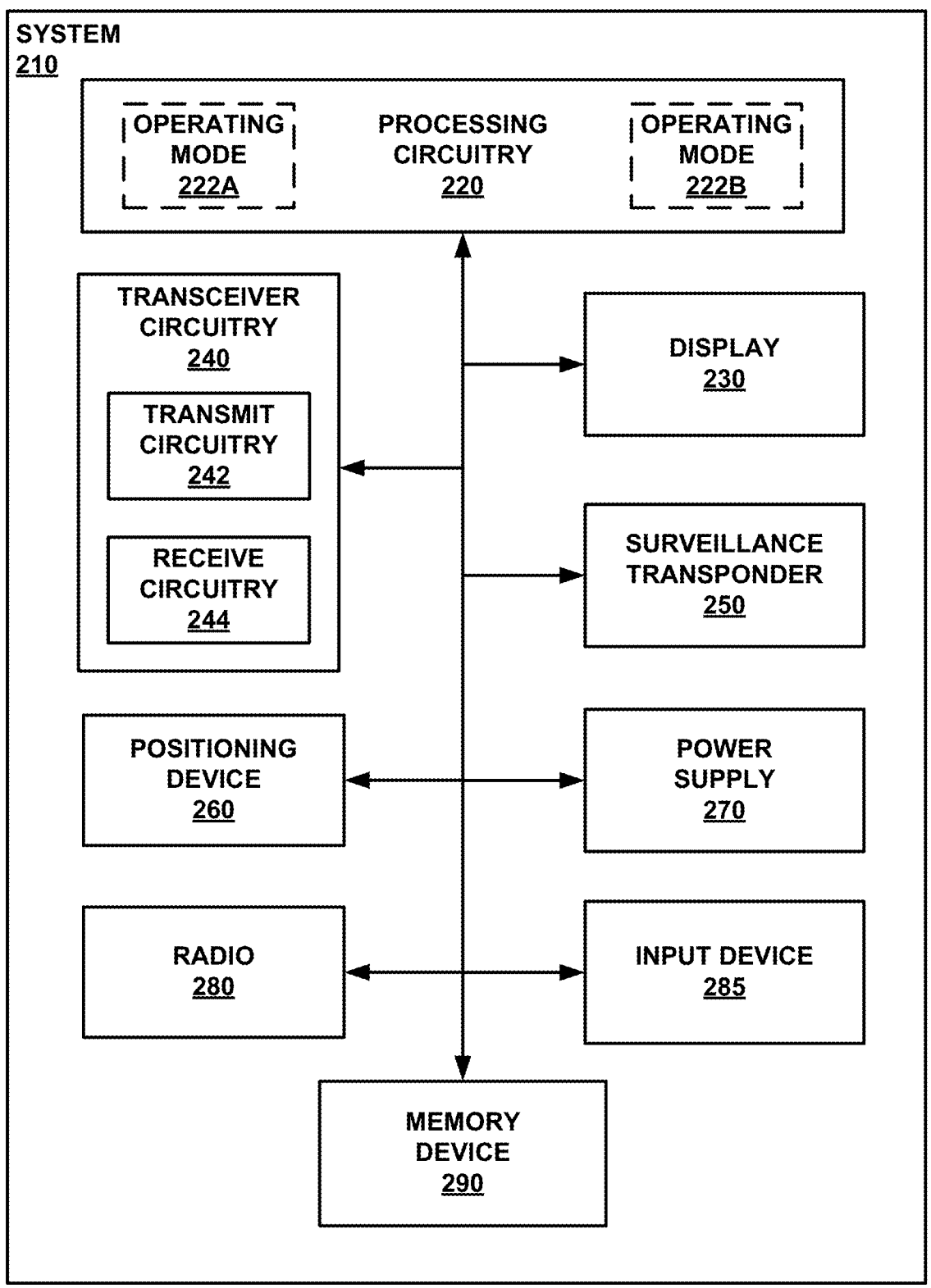
FIG. 2 is a conceptual block diagram of an example system including processing circuitry, transceiver circuitry, and a display, in accordance with some examples of this disclosure.

FIG. 2 is a conceptual block diagram of an example system 210 including processing circuitry 220, transceiver circuitry 240, and a display 230, in accordance with some examples of this disclosure. System 210, processing circuitry 220, and transceiver circuitry 240 are examples of system 110, processing circuitry 120, and transceiver circuitry 140 shown in FIG. 1.

Processing circuitry 220 may be configured to process reflected radar signals having a first polarization type in operating mode 222A and process reflected radar signals having a second polarization type in operating mode 222B. Processing circuitry 220 can run both operating modes 222A and 222B simultaneously (e.g., through multiple processors) or processing circuitry 220 can run operating modes 222A and 222B one at a time. Processing circuitry 220 can interleave operating modes 222A and 222B by executing a first sequence of instructions for radar signals having a first polarization type received by receive circuitry 244 and executing a second sequence of instructions for radar signals having a second polarization type received by receive circuitry 244. Processing circuitry 220 can interleave operating modes 222A and 222B by not executing the first and second sequences of instructions concurrently but rather executing one sequence of instructions at a time. Processing circuitry 220 can interleave operating modes 222A and 222B in such a way that a user cannot perceive processing circuitry 220 switching back and forth between sequences. In some examples, processing circuitry 220 may be configured to execute parallel processes.

System 210 and processing circuitry 220 are not limited to interleaved, parallel, one-at-a-time, and/or concurrent execution of operation modes 222A and 222B. To run operating modes 222A and 222B in parallel, system 210 may include two sets of receiver circuitry, one set for each polarization, which is more expensive than a single set of receiver circuitry but may also be more accurate. In examples in which system 210 has a single set of receiver circuitry, processing circuitry 220 can execute one of operating modes 222A and 222B on a first set of reflected radar signals to process a first type of polarization and execute the other of operating modes 222A and 222B on a second set of reflected radar signals to process a second type of polarization. The time difference between the receipt of the first set of reflected radar signals and receipt of the second set of reflected radar signals may be on the order of microseconds. Thus, adding a second set of receiver circuitry may be not worth the additional cost. However, the second set of receiver circuitry can result in faster speeds and better accuracy.

Display 230 may be configured to present information to a user (e.g., a vehicle operator, a crewmember, and/or a passenger). Display 230 may be configured to present a graphical user interface to a user, where each graphical user interface may include indications of objects with range of transceiver circuitry 240. For example, display 230 may be configured to indications of material types, material categories, and/or object types.

Display 230 may include a monitor, cathode ray tube display, a flat panel display such as a liquid crystal (LCD) display, a plasma display, a light emitting diode (LED) display, and/or any other suitable display. Display 230 may be part of a personal digital assistant, mobile phone, tablet computer, laptop computer, any other suitable computing device, or any combination thereof, with a built-in display or a separate display. Display 230 may also include means for projecting audio to a user, such as speaker(s). Processing circuitry 220 may be configured to present, via display 230, a visual, audible, tactile, or somatosensory notification (e.g., an alarm signal) indicative of a detected object. Display 230 may include or be part of any suitable device for conveying such information, including a computer workstation, a server, a desktop, a notebook, a laptop, a handheld computer, a mobile device, or the like. In some examples, processing circuitry 220 and display 230 may be part of the same device or supported within one housing (e.g., a computer or monitor). In other examples, processing circuitry 220 and display 230 may be separate devices configured to communicate through a wired connection or a wireless connection.

Processing circuitry 220 can determine a color or a value for each material category and assign the color or value to a voxel based on the determining that the reflected radar signals associated with the voxel have a specific polarimetric signature. Processing circuitry 220 can determine the presence of an object based on the radar returns and then determine a color for a graphical representation of the object. Processing circuitry 220 may be configured to output, for presentation on display 230, a graphical user interface including the graphical representation of the object with the color.

Figure 3:
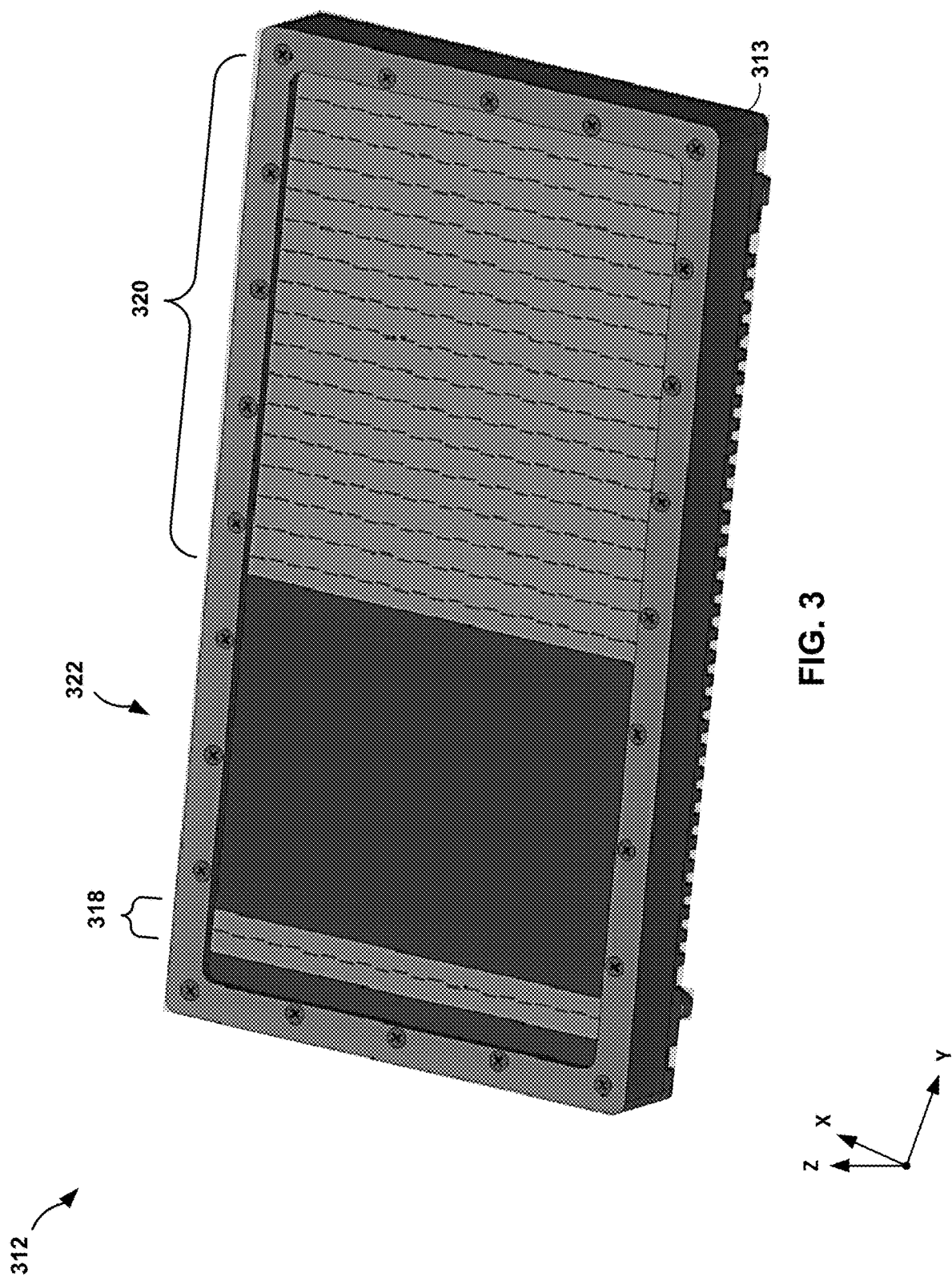
FIG. 3 is a conceptual diagram illustrating an example radar system including a frequency modulated continuous wave (FMCW) radar array.

Transceiver circuitry 240 includes transmit circuitry 242 and receive circuitry 244. In some examples, transceiver circuitry 240 may include circuitry that is used for both transmitting radar signals and receiving reflected radar signals. Circuitries 242 and 244 may be discrete circuitries that are separate from each other, or circuitries 242 and 244 may be integrated or highly integrated. FIG. 3 shows an example of transceiver circuitry 240, where transmit array 318 is an example of transmit circuitry 242 and receive array 320 is an example of receive circuitry 244. The transmit circuitry of radar array 312 and the receive circuitry of radar array 312 receive may also include circuitry that is not shown in FIG. 3 but is may be visible in FIG. 4.

Transceiver circuitry 240 can oriented on a vehicle to scan a volume of space in the direction of travel of the ownship vehicle. A polarimetric synthetic aperture radar (POLSAR) is an example of a radar device that can be used for downward-looking terrain mapping, where downward-looking is a side view for an aircraft travelling in a horizontal direction. A POLSAR can generate false color images to distinguish between materials such as asphalt and concrete. A POLSAR may not be able to generate beams as described in FIGS. 3 and 4 with respect to radar array 312. POLSAR and Doppler beam-sharpening cannot perform forward-looking radar beam scanning.

Surveillance transponder 250 may include equipment for transmitting surveillance signals and for receiving surveillance signals. In some examples, surveillance signals may include automatic-dependent surveillance-broadcast (ADS-B) signals or any other protocol for communicating position and velocity. In some examples, surveillance transponder 250 may include ADS-B in and out capabilities. Surveillance transponder 250 may include a Mode-S transponder for transmitting and receiving surveillance signals. Surveillance transponder 250 may transmit surveillance signals in digital format including the location of ownship vehicle 200. In some examples, surveillance transponder 250 may also include a receiver configured to receive positioning signals. In some examples, the receiver for positioning signals may be combined or separate from surveillance transponder 250.

In some examples, processing circuitry 220 may be configured to cause surveillance transponder 250 to transmit surveillance signals to another vehicle. In examples in which surveillance transponder 250 does not receive surveillance signals from an object, processing circuitry may be configured to determine that the object is a noncooperative vehicle or a non-vehicle object (e.g., a bird, terrain feature, power line, etc.). Processing circuitry 220 may then be configured to cause transceiver circuitry 240 to transmit radar signals to determine the location and velocity of an object. Processing circuitry 220 can determine the position of the object relative to transceiver circuitry 240.

In examples in which surveillance transponder 250 receives surveillance signals from an object, processing circuitry 220 may be configured to reduce the scanning time spent by transceiver circuitry 240 in the region of the object. In these examples, processing circuitry 220 can take less time to scan a region with a cooperative object because processing circuitry 220 can determine the location, and possibly velocity, of the object with analyzing reflected radar signals. Thus, the inclusion of a cooperative sensor, such as surveillance transponder 250, may allow transceiver circuitry 240 to take more time to scan other areas.

Positioning device 260 may be configured to receive positioning signals from GNSS transmitters. Processing circuitry 220 may be configured to determine the position of the ownship vehicle based on the positioning signals received by positioning device 260. Power supply 270 may include a battery, an alternator, an electric generator, a solar panel, and/or any other power source that can provide electrical power to the other components of system 210.

Radio 280 may be configured to transmit and receive audio signals. For example, radio 280 may include an audio receiver configured to receive audio from an operator or crewmember of the ownship vehicle. Radio 280 may also include a transceiver configured to encode the audio from the audio receiver and transmit the audio on a carrier wave to another vehicle. The transceiver may also be configured to receive audio signals (e.g., radio-frequency signals encoding audio data) from other vehicles. Processing circuitry 220 may be configured to determine the position of a target vehicle based on audio data encoded in signals received radio 280.

Input device 285 may be configured to receive user inputs from an operator or crewmember of the ownship vehicle. Processing circuitry 220 may be configured to determine a range, an azimuth extent, and/or an elevation extent based on user inputs received by input device 285. Based on user inputs received by input device 285, processing circuitry 220 may be configured to select the display characteristics of a graphical user interface presented by processing circuitry 220 on display 230.

Memory device 290 may be configured to store a three-dimensional array of voxels (e.g., a volumetric buffer), where each voxel is associated with values indicating the radar returns from the volume of space represented the respective voxel. System 210 and/or processing circuitry 220 may include a common memory (e.g., memory device 290) configured to store returns from transceiver circuitry 240 and surveillance transponder 250. Transceiver circuitry 240 and surveillance transponder 250 may share common RAM that is connected to processing circuitry 220 on a bus system, instead of separate processors, RAM, and memory for other radar systems. Some other radar systems may include a first processor for radar, a second processor for surveillance, and a third processor to combine data from the radar and surveillance functions.

In some examples, memory device 290 may store program instructions, which may include one or more program modules, which are executable by processing circuitry 220. When executed by processing circuitry 220, such program instructions may cause processing circuitry 220 to provide the functionality ascribed to it herein. The program instructions may be embodied in software, firmware, and/or RAM-ware. Memory device 290 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

A frequency-modulated continuous wave (FMCW) phased-array radar device may include an antenna array, where each element of the antenna array is configured to transmit or receive electromagnetic signals. The FMCW phased-array radar device may control the direction of a beam of electromagnetic signals that is transmitted by the antenna array. The direction of the beam may be based on the phase relationship (i.e., phase shift) of the electromagnetic signals transmitted from each element of the antenna array. Each element of the antenna array may include a separate transmitter and/or receiver to generate a digitally generated phase shift. The digitally generated phase shift is achieved at low intermediate frequencies and does not occur at the carrier frequency of the radar. This radar is referred to as a Digital Active Phased Array Radar (DAPA).

An FMCW phased-array radar device may include electronic scanning rather than or in addition to mechanical scanning. The electronic scanning may include generating a digitally generated phase shift in the electromagnetic signals transmitted by the antenna array to control the direction of a beam. The electronic scanning may also include determining a digitally generated phase shift in electromagnetic signals received by the antenna array. In some examples, an FMCW phased-array radar device may include a mechanical scanning apparatus for moving, tilting, and/or rotating the antenna array in one plane.

FIG. 3 is a conceptual diagram illustrating an example radar system including an FMCW radar array 312 (e.g., a radar panel). In some examples, transceiver circuitry 140 shown in FIG. 1 may include any number of FMCW radar arrays 312, such as at least one FMCW radar array 312 or a plurality of FMCW radar arrays 312. Each FMCW radar array includes a housing 313, a transmit array 318, and a receive array 320. Transmit array 318 includes a respective transmit antenna including a plurality of transmit elements. Similarly, receive array 320 includes a respective receive antenna including a plurality of receive elements.

For FMCW radar array 312, transmit array 318 and receive array 320 are mechanically attached or coupled to housing 313. In some examples, as shown in FIG. 3, housing 313 may include two sidewalls, two end walls, and a back wall. Housing 313 generally defines a rectangular box, with one side (the front side) being substantially open. The front side of housing 313 may be substantially open, exposing the transmit elements and receive elements.

FMCW radar array 312 may be mechanically coupled to a radar system frame, which may be mechanically coupled to a frame of a vehicle on which the radar system is used. In other examples, FMCW radar array 312 may be mechanically coupled directly to frame of the vehicle on which the radar system is used.

A transmit array/receive array pair may be configured to scan a predetermined window with a predetermined extent in azimuth and elevation. In some examples, the predetermined extent in azimuth may be about ±40° from the plane orthogonal to the face of the transmit array/receive array pair or about ±38° in azimuth. For example, three transmit array/receive array pairs may be disposed at angles with respect to each other and the predetermined window for each transmit array/receive array pair may overlap with the predetermined window for the adjacent transmit array/receive array pair(s), radar system may allow a total azimuth scan area of between about 220° and about 228° in some examples. The total azimuth scan area may depend at least in part on an overlap in azimuth between scan areas of three FMCW radar arrays 312.

FMCW radar array 312 also includes an electronic band gap (EBG) isolator 322. EBG isolator 322 is disposed between transmit array 318 and receive array 320. EBG isolator 322 may be formed of an electrically conductive material or formed of an electrically insulating material coated with an electrically conductive material. EBG isolator 322 may be build using standard printed circuit methods and may use less volume and be less expensive to implement, as compared to a slotted choke. EBG isolator 322 may be placed to attenuate strength of electromagnetic radiation output by a respective one of the transmit elements at the adjacent one of the receive elements. EBG isolator 322 may be configured to prevent propagation across the surface between the transmit elements and the receive elements. EBG isolator 322 may include tiny squares that are shorted to ground with a small printed via.

Transmit arrays 318 includes a transmit antenna including a plurality of transmit elements. FMCW radar array 312 includes a transmit array 318 and a receive array 320. Transmit array 318 includes a transmit antenna including a plurality of transmit elements. In some examples, the plurality of transmit elements may be disposed in a plurality of rows, where the number of transmit elements in each respective row is the same. In some examples, the number of transmit elements in a single row is greater than the number of rows in the transmit antenna. In this way, in some examples, the transmit antenna may be wider than it is tall, and the transmit beam formed by the transmit antenna may be larger in elevation than in azimuth, such as forming an elliptical shape that is taller than it is wide. In some examples, this may allow the transmit beam to cover substantially the entire elevation of the predetermined window in a single scan.

Both the full version and the smaller version of a DAPA radar device may include high-aspect-ratio transmit antennas and essentially square receive antennas. The full version of DAPA may include two rows of patch elements that are joined into simple two-element columns. The smaller version of DAPA may include just one substrate-integrated waveguide stick to provide transmit illumination. The smaller version of DAPA may be configured to have a wide azimuth beam, and DAPA may be configured to have a wide elevation beam. Thus, the full version and the smaller version of DAPA are designed to be rotated ninety degrees from each other.

In other examples, the number of transmit elements in a single row is less than the number of rows in the transmit antenna. In this way, in some examples, the transmit antenna may be taller than it is wide, and the transmit beam formed by the transmit antenna may be larger in azimuth than in elevation, such as forming an elliptical shape that is wider than it is tall. In some examples, this may allow the transmit beam to cover substantially the entire azimuth of the predetermined window in a single scan.

In general, the number of transmit elements in a first transmit array dimension (e.g., width or height) may be greater than the number transmit elements in a second transmit array dimension (e.g., height or width). The first transmit array dimension may be substantially perpendicular to the second transmit array dimension. A transmit antenna that includes a greater number of transmit elements in the first transmit array dimension than in the second transmit array dimension may produce a transmit beam that is elongated in a first illumination dimension compared to a second, substantially perpendicular illumination dimension. Although the remainder of this description describes examples in which the transmit antenna includes more transmit elements in a single row that the number of rows of transmit elements, a person having ordinary skill in the art will understand that the first and second transmit array dimensions may be any substantially perpendicular dimensions, and that the first and second illumination dimensions are based on the first and second transmit array dimensions.

In the example illustrated in FIG. 3, the transmit antenna includes one row of transmit elements, and the row includes twenty-four transmit elements. However, in other examples, the transmit antenna may include more than one row of transmit elements, and each row of the transmit antenna may include more or fewer than twenty-four transmit elements. In general, the transmit antenna may include at least one row of transmit elements, and each row may include a plurality of transmit elements. Alternatively, or additionally, transmit elements may not be arranged in a row as depicted in FIG. 3; instead, transmit antenna elements may be arranged in another geometric or non-geometric array. In some examples, transmit elements may include aperture coupled microstrip patches.

FMCW array 312 also includes a receive array 320 including a plurality of printed circuit boards (PCBs) 326A and 326B (see FIG. 4) on which or in which at least some of the electronics and receive elements of receive array 320 are disposed. Each of PCBs 326A and 326B is connected to a master interconnect board 328 (see FIG. 4) by a respective one of connectors. A master interconnect board may be mechanically attached or coupled to housing 313, e.g., to a back wall of housing 313.

Each of PCBs 326A and 326B includes a plurality of receive elements. In some examples, the receive elements may be radiating dipoles. In some examples, the receive elements may be aperture coupled microstrip patches. In other examples, receive array 320 may include another physical configuration more or fewer PCBs 326A and 326B, or a construction similar to transmit array 318, in which a plurality of receive elements are mounted on or formed in a major surface of a printed board or other substrate.

Figure 4:
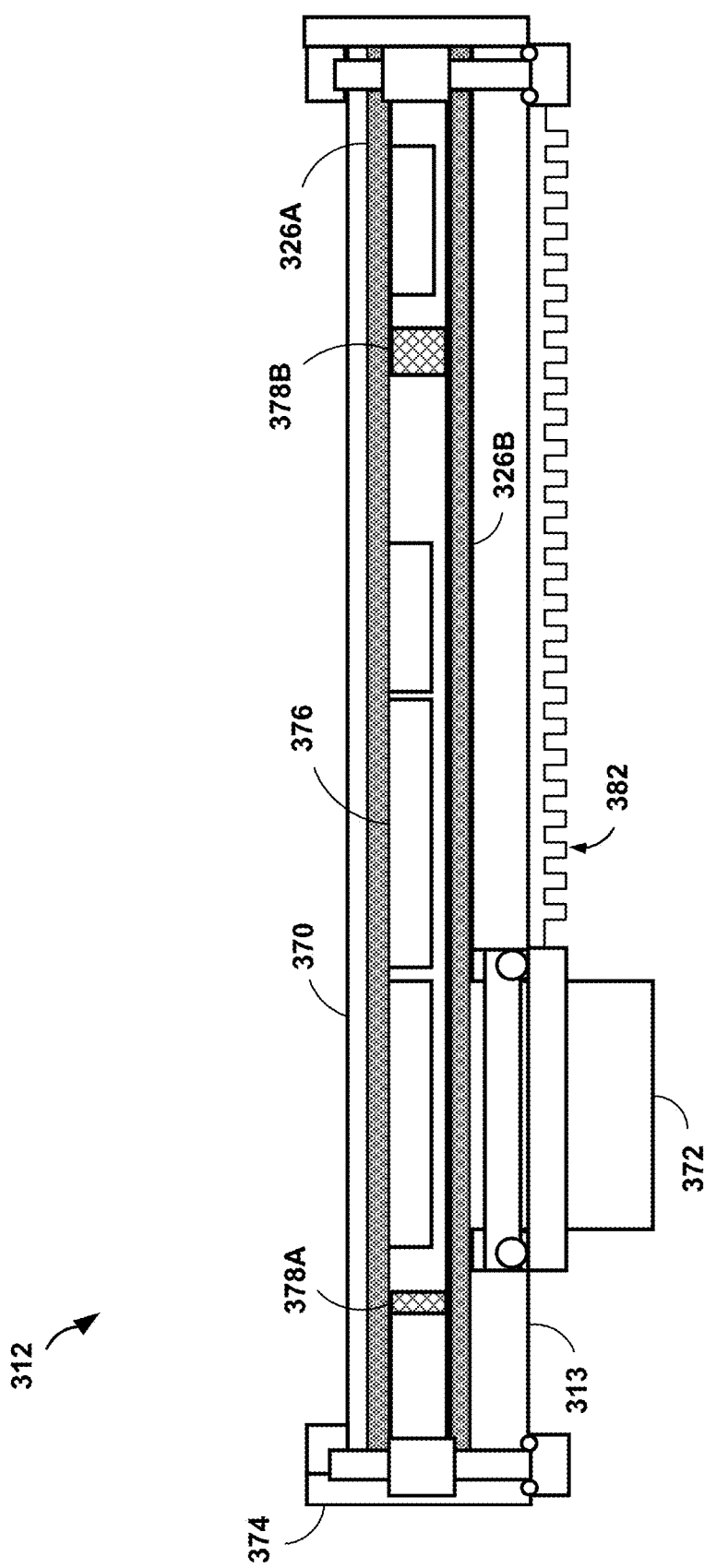
FIG. 4 depicts a side view of FMCW radar array including housing, printed circuit boards, structural core, circular connector, stand-off, cavity, and board-to-board connectors.

FIG. 4 depicts a side view of FMCW radar array 312 including housing 313, PCBs 326A and 326B, structural core 370, MIL circular connector 372, stand-off 374, cavity 376, and board-to-board connectors 378. FIG. 4 depicts one example construction of a smaller version of DAPA. PCBs 326A and 326B, which are inside housing 313, may include electrical connections for structural core 370, the transmit antenna array and the receive antenna array(s), and board-to-board connectors 378. PCBs 326A and 326B may include small metal shields that cover active circuitry to prevent internal coupling and noise. PCB 326A may include the antenna and radio-frequency circuitry, and PCB 326B may include the core digital and power supply circuitry.

MIL circular connector 372 may include a mechanical element that is configured to mount on a vehicle frame. Stand-off 374 may be configured to protect structural core 370 from damage. Cavity 376 may be positioned in the center of the chassis of FMCW radar array 312. Cavity 376 may extend five or six millimeters in the z-axis direction. Heat sink 382 may include ribs machined into the chassis of FMCW radar array 312. In some examples, FMCW radar array 312 may have dimensions of only four inches in the x-axis direction by eight inches in the y-axis direction by one inch in the z-axis direction.

Radar array 312, which is an example of transceiver circuitry 140 and 240, includes circuit boards 326A and 326B. Radar array also includes transmit circuitry including array 318, which can be patch elements integrated into PCB 326A, and receive circuitry including array 320, which can be patch elements integrated into PCB 326B. Array 320 may be configured to receive reflected radar signals having multiple polarization types. In some examples, array 320 may be able to simultaneously receive multiple polarizations, or array 320 may be configured to only receive one polarization at a time, which requires simpler circuitry. The processing circuitry can interleave operating modes, where each operating mode processes one polarization at a time.

Radar array 312 may be configured to use a fixed wide-beam illumination in azimuth and electronically scan that fixed illumination vertically using bulk methods of varactors and PIN diodes distributed across the back of transmit elements 324 and receive elements 320 and not as typical individual phase shifters. The system may be configured to form one monopulse receive beam at a time, where the monopulse receive beam is electronically scanned with demodulation circuitry. Processing circuitry 120 may be configured to perform vertical beam steering using distributed varactors and PIN diodes.

Figure 5B:
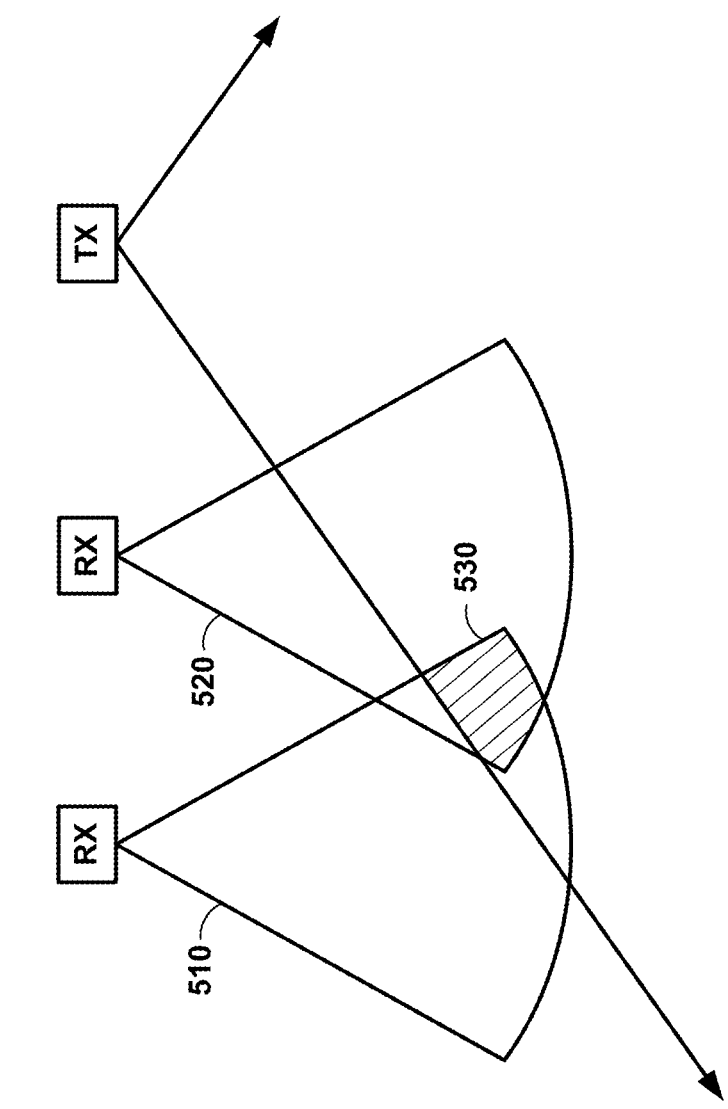
FIGS. 5A and 5B are conceptual diagrams of beams within the bandwidths of two radar devices, in accordance with some examples of this disclosure.
Figure 5A:
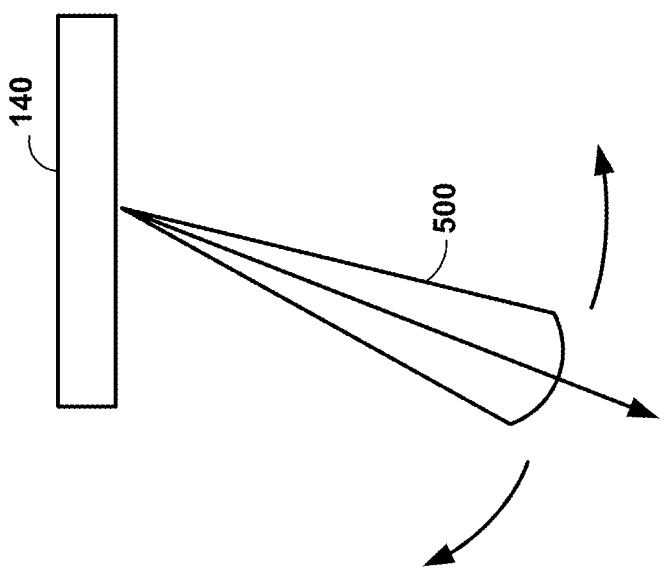

FIGS. 5A and 5B are conceptual diagrams of beams within the bandwidths of two radar devices, in accordance with some examples of this disclosure. Transceiver circuitry 140 can form beam 500 to within five or ten percent of the beamwidth of transceiver circuitry 140. System 110 may be configured to form beam 500 by a sub-resolving using monopulse techniques. Processing circuitry 120 can measure azimuth, elevation, and range everywhere in beam 500. System 110 may be able to electronically scan over forty-five degrees in azimuth.

A direction of arrival system can form wide beams 510 and 520 that must resolve target locations within beam overlap area 530 of the two receive elements via relative phase between the two receivers. The direction of arrival system can only measure and detect objects where the transmit beam and the receive beams overlap (area 530). The direction of arrival system cannot be electronically scanned to change field of regard to be other than straight ahead. The receive elements of a direction of arrival system may be spaced apart at multiple wavelengths.

Processing circuitry 120 may be configured to form a beam on receive at intermediate frequencies based on reflected radar signals 162. Processing circuitry 120 can use the beam to determine the category of material 152 based on the polarization of reflected radar signals 162. In contrast, a direction of arrival system, as shown in FIG. 5B, may form beams at radio-frequency (RF) frequencies (e.g., the frequencies of the transmitted radar signals).

In general, a phased-array radar device may have many receive channels and may have much higher gain or signal collection capability. For direction of arrival antennas, each antenna column is an entire receive antenna used to detect signals. A direction of arrival antenna can collect one-eighth of the signal amplitude, as compared to a phased-array radar device. The direction of arrival antenna detects detailed target structure by making phase measurements between two channels for each direction. The two receive antenna columns of a direction of arrival antenna may each be at least sixty degrees wide in azimuth. The direction of arrival system then attempts to resolve a small fraction of the beamwidth via signal processing.

Figure 6A:
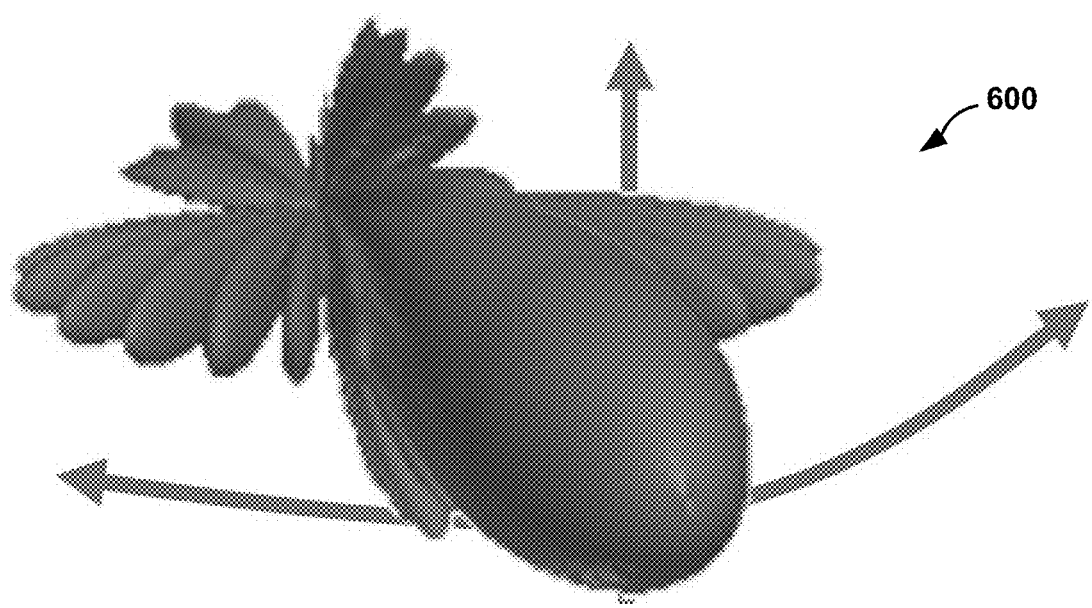
FIGS. 6A and 6B are diagrams of antenna patterns for two radar devices, in accordance with some examples of this disclosure.
Figure 6B:
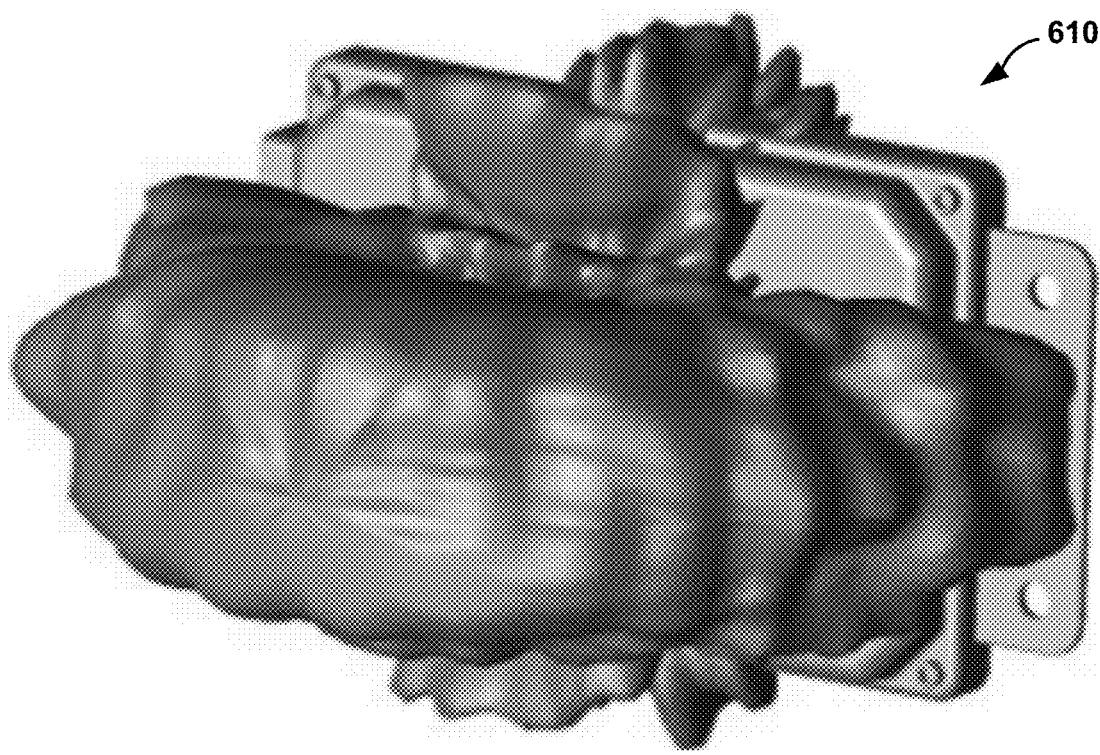

FIGS. 6A and 6B are diagrams of antenna patterns 600 and 610 for two radar devices, in accordance with some examples of this disclosure. Patterns 600 and 610 are three-dimensional contour maps or plots of the antenna patterns for the two radar devices. Pattern 600 is an electronically scanned sharp antenna pattern for a phased-array radar device, such as system 110. Pattern 600 shows one narrow, electronically scanned beam that the radar device uses to detect objects. System 110 can sub-resolve the angle of the main beam shown in pattern 600 using monopulse techniques to measure azimuth angle and elevation angle.

Pattern 610 includes multiple, wide patterns that are combined in order to resolve target location in angle via direction of arrival techniques. Pattern 610 may be used in automotive short-range radars. The peak amplitudes for pattern 610 are spread widely across azimuth and spread moderately across elevation. A radar device generating pattern 610 shown in FIG. 6B can scan with a short range and a wide field of regard. The radar device may also be able to scan with a longer range and a narrow field of regard. Pattern 610 corresponds to the short range and wide field of regard. Pattern 610 is an example antenna pattern for a direction of arrival transceiver (see, e.g., FIG. 5B). A direction of arrival radar device may be overwhelmed by the scattering of radar signals in dense environments, such as a street corner in a busy urban area.

Dual polarization radar, such as dual circular polarization radar, can produce clear determinations of objects with material in a natural category (e.g., vegetation or soil) and objects with material in a man-made category (e.g., concrete, glass, or metal). Processing circuitry 120 may apply a Bayesian classifier in a consistent way to an image to generate training information. Processing circuitry 120 can apply or expose the trained classifier to the received radar signals of other known objects (e.g., dual RHCP/LHCP data collected from new object scenes) that are not part of the original training to determine the accuracy of the classifier. Processing circuitry 120 may be configured to improve the classifier for the purpose of providing an acceptable correct determination of material categories or classification ratios. Processing circuitry 120 may be configured to associate a set of voxels in a three-dimensional array with an object based on the polarimetric signature (e.g., power, phase, and shape) and based on the Bayesian classifier algorithm.

Processing circuitry 120 may be configured to apply an algorithm to identify basic categories, such as vegetation, humans, metal, and concrete. Using polarization types on receive can produce better results for determining edges of objects, as compared to brightness or Doppler techniques.

Figure 7:
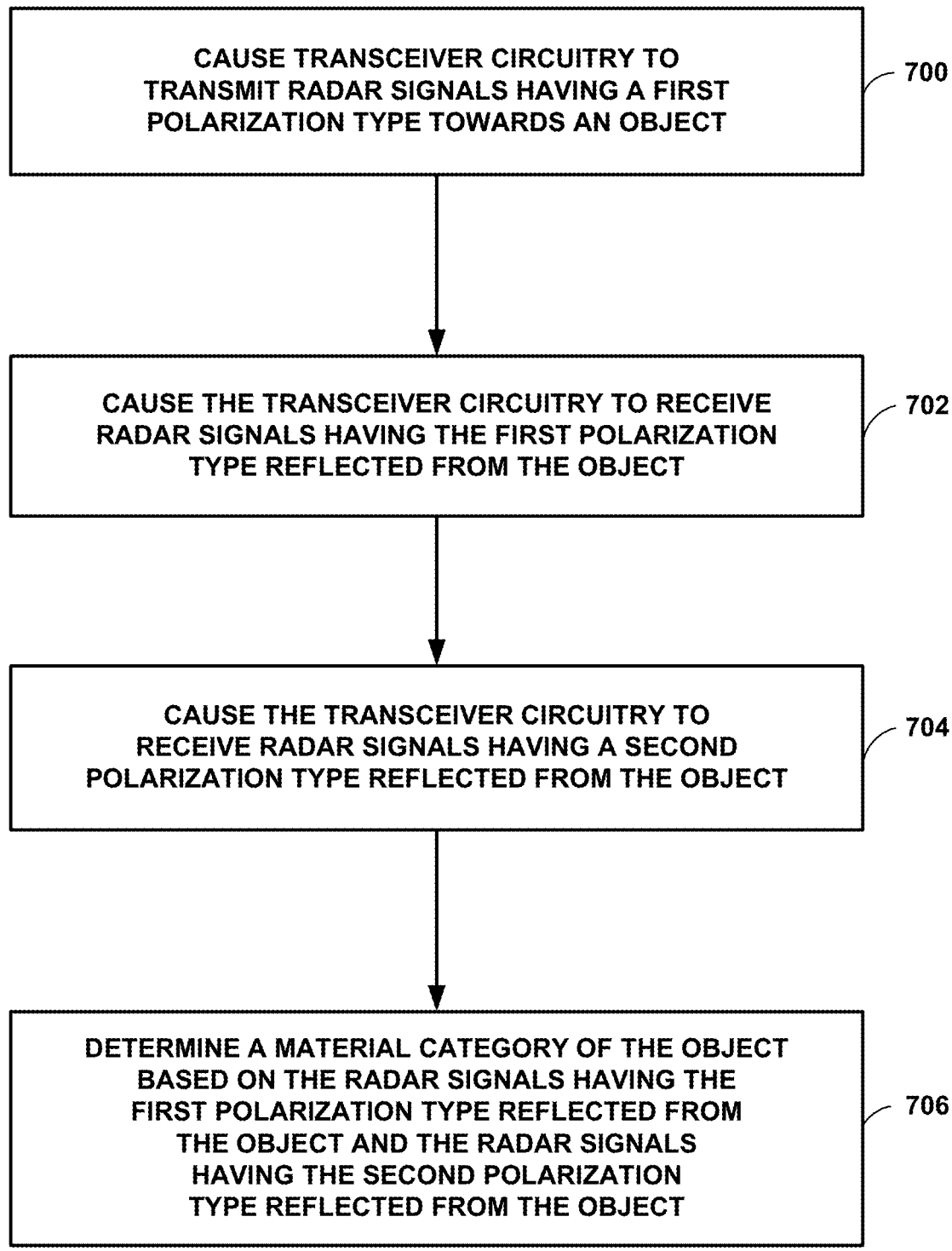
FIGS. 7 and 8 are flowcharts illustrating example techniques for determining a material category of an object, in accordance with some examples of this disclosure.
Figure 8:
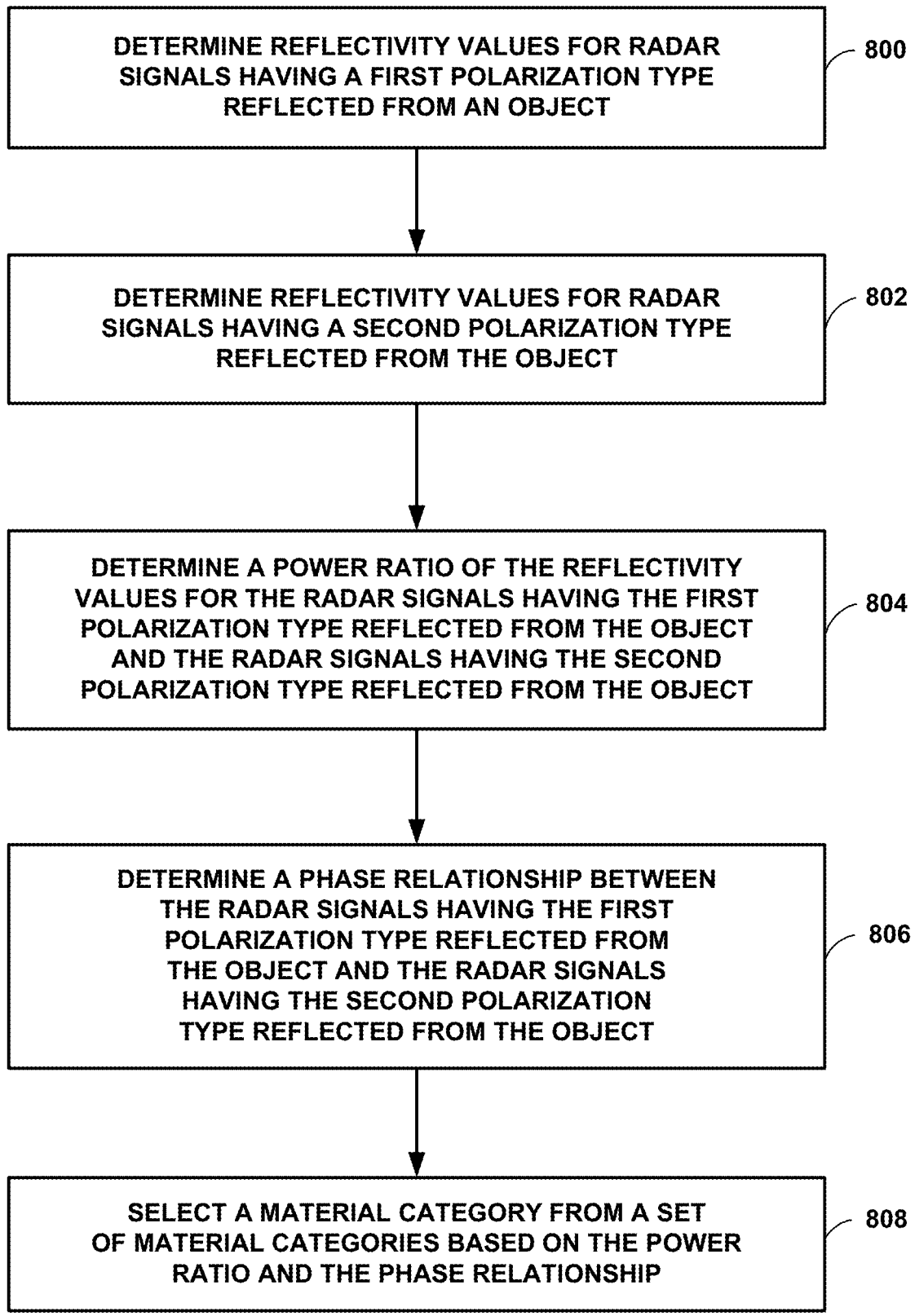

FIGS. 7 and 8 are flowcharts illustrating example techniques for determining a material category of an object, in accordance with some examples of this disclosure. The techniques of FIGS. 7 and 8 are described with reference to processing circuitry 120 shown in FIG. 1, although other components, such as processing circuitry 220 shown in FIG. 2, may exemplify similar techniques.

In the example of FIG. 7, processing circuitry 120 causes transceiver circuitry 140 to transmit radar signals 160 having a first polarization type towards object 150 (700). The first polarization type may be RHCP or LHCP. In some examples, the transmit circuitry of transceiver circuitry 140 includes an array of elements with a high aspect ratio.

In the example of FIG. 7, processing circuitry 120 causes transceiver circuitry 140 to receive radar signals 162 having the first polarization type reflected from object 150 (702). In the example of FIG. 7, processing circuitry 120 also causes transceiver circuitry 140 to receive radar signals 162 having a second polarization type reflected from object 150, the second polarization type being different than the first polarization type (704).

Transceiver circuitry 140 can receive radar signals with the two polarization types simultaneously (e.g., in parallel) or by alternating between receiving radar signals having the first polarization type and radar signals having the second polarization type. The receive circuitry for receiving radar signals with the two polarization types simultaneously is more complex than the receive circuitry for receiving radar signals with a single polarization type. The circuitry for simultaneous reception can include two receivers, which increases the size and complexity of the receive circuitry.

Therefore, to reduce complexity and cost, transceiver circuitry 140 may include circuitry for only a single polarization on receive, where the circuit for a single polarization is a hardware channel. Processing circuitry 120 can switch back and forth between processing reflected radar signals having the first polarization type and reflected radar signals having the second polarization type. This process of switching back and forth takes longer than receiving and processing both polarization simultaneously, but the receive circuitry is less complex, less expensive, and smaller. In some examples, transceiver circuitry 140 can transmit RHCP signals and receiving RHCP signals, switch to transmitting RHCP signals and receiving LHCP signals, and then switch back to transmitting RHCP signals and receiving RHCP signals. Processing circuitry 120 can use the same or very similar algorithms and instructions for processing both polarization types.

In the example of FIG. 7, processing circuitry 120 determines the category of material 152 of object 150 based on radar signals 162 having the first polarization type reflected from object 150 and radar signals 162 having the second polarization type reflected from object 150 (706). Processing circuitry 120 can use polarimetric signatures that show the difference between power and phase between the two channels on receive. The polarimetric signatures can be the amplitude difference and the phase difference between the two channels. System 110 can retain phase information throughout transceiver circuitry 140 and the signal processing in processing circuitry 120.

In some examples, transceiver circuitry 140 transmits circularly polarized radar signals 160, and object 150 causes reflected radar signals 162 to have elliptically polarization. The elliptical polarization is tilted at an angle that defined by the vertical and horizontal components of the polarization. Radar signals 160 may have equal vertical and horizontal components, such that radar signals 160 are circularly polarized. If object 150 reflects back primarily the vertical component and not much of the horizontal component, the elliptical polarization on receive will be vertically oriented, assuming that the phase has not changed. The phase relationship between the two polarization channels can indicate additional information about object 150.

Processing circuitry 120 can use multiple signature characteristics (e.g., power ratio, phase relationship, and shape of the ellipse) to determine and validate a determination of the category of material 152. The shape of the polarization is a combination of the power ratio and the phase relationship. If object 150 changes the amplitude of one of the polarization components and the phase, circularly polarized radar signals can become elliptically polarized radar signals. Rotating the phase can cause the vertical and horizontal components to no longer be falling along the sinusoidal pattern in lock step. If object 150 changes the phase of circularly polarized radar signals, the reflected radar signals may be elliptically polarized. Processing circuitry 120 can determine the magnitude difference between the two polarization types based on the phase relationship and based on the coupling in the antenna indicates the tilt of the ellipse.

In the example of FIG. 8, processing circuitry 120 determines reflectivity values for reflected radar signals 162 having a first polarization type (800) and determines reflectivity values for reflected radar signals 162 having a second polarization type (802). Processing circuitry 120 then determines a power ratio of the reflectivity values for the two polarization types (804). A metal surface has a relatively high power ratio (e.g., thirty decibels), and a human pedestrian has a relatively low power ratio (e.g., two decibels).

In the example of FIG. 8, processing circuitry 120 determines a phase relationship between reflected radar signals 162 having the two polarization types (806). Phase information regarding reflected radar signals 162 may travel throughout transceiver circuitry 140. Processing circuitry 120 selects the category of material 152 from a set of material categories based on the power ratio and the phase relationship (808). Processing circuitry 120 may be configured to apply an algorithm, such as a Bayesian classifier algorithm, to the power ratio and the phase relationship to determine the category of material 152. Processing circuitry 120 can use the power ratio and the phase relationship as input variables into the algorithm. The shape of the polarimetric signature of reflected radar signals 162 may be another input variable.

The following numbered examples demonstrate one or more aspects of the disclosure.

Example 1. A radar device is configured to detect an object, where the radar device includes transceiver circuitry configured to transmit radar signals having a first polarization type towards the object, receive radar signals having the first polarization type reflected from the object, and receive radar signals having a second polarization type reflected from the object, the second polarization type being different than the first polarization type. The radar device also includes processing circuitry configured to determine a material category of the object based on the radar signals having the first polarization type reflected from the object and the radar signals having the second polarization type reflected from the object.

Example 2. The radar device of example 1, wherein the processing circuitry is configured to determine the material category at least in part by selecting the material category from a set of material categories including a conductive surface, vegetation, and a human.

Example 3. The radar device of examples 1-2 or any combination thereof, wherein the transceiver circuitry includes an antenna array configured to receive the radar signals having the first polarization type reflected from the object.

Example 4. The radar device of examples 1-3 or any combination thereof, wherein the transceiver circuitry includes an antenna array configured to receive the radar signals having the second polarization type reflected from the object.

Example 5. The radar device of examples 1-4 or any combination thereof, wherein the processing circuitry is further configured to interleave a first operating mode and a second operating mode.

Example 6. The radar device of examples 1-5 or any combination thereof, wherein the processing circuitry is further configured to determine reflectivity values for the radar signals having the first polarization type reflected from the object in the first operating mode.

Example 7. The radar device of examples 1-6 or any combination thereof, wherein the processing circuitry is further configured to determine reflectivity values for the radar signals having the second polarization type reflected from the object in the second operating mode.

Example 8. The radar device of examples 1-7 or any combination thereof, wherein the processing circuitry is further configured to determine a power ratio of the radar signals having the first polarization type reflected from the object and the radar signals having the second polarization type reflected from the object.

Example 9. The radar device of examples 1-8 or any combination thereof, wherein the processing circuitry is configured to determine the material category of the object based on the power ratio.

Example 10. The radar device of examples 1-9 or any combination thereof, wherein the processing circuitry is configured to determine the material category of the object at least in part by determining a conductive material category for the object in response to determining that the power ratio of the radar signals exceeds a first threshold ratio.

Example 11. The radar device of examples 1-10 or any combination thereof, wherein the processing circuitry is configured to determine the material category of the object at least in part by determining an insulative material category for the object in response to determining that the power ratio of the radar signals does is less than a second threshold ratio.

Example 12. The radar device of examples 1-11 or any combination thereof, wherein the processing circuitry is further configured to associate a set of voxels with the object based on a power ratio of radar signals reflected from the set of voxels and further based on a Bayesian classifier algorithm.

Example 13. The radar device of examples 1-12 or any combination thereof, wherein the processing circuitry is further configured to determine a phase relationship between the radar signals having the first polarization type reflected from the object and the radar signals having the second polarization type reflected from the object.

Example 14. The radar device of examples 1-13 or any combination thereof, wherein the processing circuitry is configured to determine the material category of the object based on the phase relationship.

Example 15. The radar device of examples 1-14 or any combination thereof, wherein the processing circuitry is configured to determine the material category of the object based on an algorithm including, as input variables, a power ratio of the radar signals having the first polarization type reflected from the object and the radar signals having the second polarization type reflected from the object.

Example 16. The radar device of examples 1-15 or any combination thereof, wherein the processing circuitry is configured to determine the material category of the object based on an algorithm including, as input variables, a phase relationship between the radar signals having the first polarization type reflected from the object and the radar signals having the second polarization type reflected from the object.

Example 17. The radar device of examples 1-16 or any combination thereof, wherein the transceiver circuitry includes a circuit board.

Example 18. The radar device of examples 1-17 or any combination thereof, wherein the transceiver circuitry includes transmit circuitry including a first array of patch elements integrated into the circuit board and configured to transmit the radar signals having the first polarization type.

Example 19. The radar device of examples 1-18 or any combination thereof, wherein the transceiver circuitry includes receive circuitry including a second array of patch elements integrated into the circuit board and configured to receive the radar signals having the first polarization type reflected from the object and receive the radar signals having a second polarization type reflected from the object.

Example 20. The radar device of examples 1-19 or any combination thereof, wherein the first polarization type includes right-hand circular polarization.

Example 21. The radar device of examples 1-20 or any combination thereof, wherein the second polarization type includes left-hand circular polarization.

Example 22. The radar device of examples 1-21 or any combination thereof, wherein the first polarization type includes an elliptical polarization.

Example 23. The radar device of examples 1-22 or any combination thereof, wherein the first polarization type includes a linear polarization.

Example 24. The radar device of examples 1-23 or any combination thereof, wherein the processing circuitry is configured to determine the material category at least in part by forming a beam at an intermediate frequency of the transceiver circuitry.

Example 25. The radar device of examples 1-24 or any combination thereof, wherein the processing circuitry is further configured to determine a color for a graphical representation of the object.

Example 26. The radar device of examples 1-25 or any combination thereof, wherein the processing circuitry is further configured to output, for display, a graphical user interface including the graphical representation of the object with the color.

Example 27. The radar device of examples 1-26 or any combination thereof, wherein the processing circuitry is configured to determine an electrical conductivity of the object based on the radar signals having the first polarization type reflected from the object and the radar signals having the second polarization type reflected from the object.

Example 28. A device including a computer-readable medium having executable instructions stored thereon, configured to be executable by processing circuitry for causing the processing circuitry to cause transceiver circuitry to transmit radar signals having a first polarization type towards an object. The instructions are further configured to be executable by the processing circuitry to cause the transceiver circuitry to receive radar signals having the first polarization type reflected from the object and to cause the transceiver circuitry to receive radar signals having a second polarization type reflected from the object, the second polarization type being different than the first polarization type. The instructions are further configured to be executable by the processing circuitry to determine a material category of the object based on the radar signals having the first polarization type reflected from the object and the radar signals having the second polarization type reflected from the object.

Example 29. The device of example 28, wherein the instructions are configured to be executable by the processing circuitry for further causing the processing circuitry to interleave a first operating mode and a second operating mode.

Example 30. The device of examples 28-29 or any combination thereof, wherein the instructions are configured to be executable by the processing circuitry for further causing the processing circuitry to determine reflectivity values for the radar signals having the first polarization type reflected from the object in the first operating mode.

Example 31. The device of examples 28-30 or any combination thereof, wherein the instructions are configured to be executable by the processing circuitry for further causing the processing circuitry to determine reflectivity values for the radar signals having the second polarization type reflected from the object in the second operating mode.

Example 32. The device of examples 28-31 or any combination thereof, wherein the instructions are configured to be executable by the processing circuitry for causing the processing circuitry to determine the material category of the object is based on a power ratio of the radar signals having the first polarization type reflected from the object and the radar signals having the second polarization type reflected from the object.

Example 33. The device of examples 28-32 or any combination thereof, wherein the instructions are configured to be executable by the processing circuitry for causing the processing circuitry to determine the material category of the object is based on a phase relationship between the radar signals having the first polarization type reflected from the object and the radar signals having the second polarization type reflected from the object.

Example 34. The device of examples 28-33 or any combination thereof, wherein the instructions are configured to be executable by the processing circuitry for further causing the processing circuitry to determine a color for a graphical representation of the object.

Example 35. The device of examples 28-34 or any combination thereof, wherein the instructions are configured to be executable by the processing circuitry for further causing the processing circuitry to output, for display, a graphical user interface including the graphical representation of the object with the color.

Example 36. The device of examples 28-35 or any combination thereof, wherein the instructions are configured to be executable by the processing circuitry for further causing the processing circuitry to determine the material category at least in part by selecting the material category from a set of material categories including a conductive surface, vegetation, and a human.

Example 37. The device of examples 28-36 or any combination thereof, wherein the instructions to determine the material category of the object comprises instructions to determine a conductive material category for the object in response to determining that the power ratio of the radar signals exceeds a first threshold ratio.

Example 38. The device of examples 28-37 or any combination thereof, wherein the instructions to determine the material category of the object comprises instructions to determine an insulative material category for the object in response to determining that the power ratio of the radar signals does is less than a second threshold ratio.

Example 39. The device of examples 28-38 or any combination thereof, wherein the instructions are configured to be executable by the processing circuitry for further causing the processing circuitry to associate a set of voxels with the object based on a power ratio of radar signals reflected from the set of voxels and further based on a Bayesian classifier algorithm.

Example 40. The device of examples 28-39 or any combination thereof, wherein the instructions to determine the material category of the object comprise instructions to determine the material category of the object based on an algorithm including, as input variables, a power ratio of the radar signals having the first polarization type reflected from the object and the radar signals having the second polarization type reflected from the object and a phase relationship between the radar signals having the first polarization type reflected from the object and the radar signals having the second polarization type reflected from the object.

Example 41. The device of examples 28-40 or any combination thereof, wherein the instructions to determine the material category comprise instructions to form a beam at an intermediate frequency of the transceiver circuitry.

Example 42. The device of examples 28-41 or any combination thereof, wherein the instructions to determine the material category comprise instructions to determine an electrical conductivity of the object based on the radar signals having the first polarization type reflected from the object and the radar signals having the second polarization type reflected from the object Example 43. A method for detecting an object comprises causing transceiver circuitry to transmit radar signals having a first polarization type towards the object and causing the transceiver circuitry to receive radar signals having the first polarization type reflected from the object. The method further includes causing the transceiver circuitry to receive radar signals having a second polarization type reflected from the object, the second polarization type being different than the first polarization type. The method includes determining a material category of the object based on the radar signals having the first polarization type reflected from the object and the radar signals having the second polarization type reflected from the object.

Example 44. The method of example 43, wherein determining the material category includes selecting the material category from a set of material categories including a conductive surface, vegetation, and a human.

Example 45. The method of examples 43-44 or any combination thereof, further including interleaving a first operating mode and a second operating mode.

Example 46. The method of examples 43-45 or any combination thereof, further including determining reflectivity values for the radar signals having the first polarization type reflected from the object in the first operating mode.

Example 47. The method of examples 43-46 or any combination thereof, further including determining reflectivity values for the radar signals having the second polarization type reflected from the object in the second operating mode.

Example 48. The method of examples 43-47 or any combination thereof, further including determining a power ratio of the radar signals having the first polarization type reflected from the object and the radar signals having the second polarization type reflected from the object.

Example 49. The method of examples 43-48 or any combination thereof, wherein determining the material category of the object is based on the power ratio.

Example 50. The method of examples 43-49 or any combination thereof, wherein determining the material category of the object comprises determining a conductive material category for the object in response to determining that the power ratio of the radar signals exceeds a first threshold ratio.

Example 51. The method of examples 43-50 or any combination thereof, wherein determining the material category of the object comprises determining an insulative material category for the object in response to determining that the power ratio of the radar signals does is less than a second threshold ratio.

Example 52. The method of examples 43-51 or any combination thereof, further including associating a set of voxels with the object based on a power ratio of radar signals reflected from the set of voxels and further based on a Bayesian classifier algorithm.

Example 53. The method of examples 43-52 or any combination thereof, further including determining a phase relationship between the radar signals having the first polarization type reflected from the object and the radar signals having the second polarization type reflected from the object.

Example 54. The method of examples 43-53 or any combination thereof, wherein determining the material category of the object comprises determining the material category of the object based on the phase relationship.

Example 55. The method of examples 43-54 or any combination thereof, wherein determining the material category of the object is based on an algorithm including, as input variables, a power ratio of the radar signals having the first polarization type reflected from the object and the radar signals having the second polarization type reflected from the object.

Example 56. The method of examples 43-55 or any combination thereof, wherein determining the material category of the object is based on an algorithm including, as input variables, a phase relationship between the radar signals having the first polarization type reflected from the object and the radar signals having the second polarization type reflected from the object.

Example 57. The method of examples 43-56 or any combination thereof, wherein determining the material category comprises forming a beam at an intermediate frequency of the transceiver circuitry.

Example 58. The method of examples 43-57 or any combination thereof, further including determining a color for a graphical representation of the object.

Example 59. The method of examples 43-58 or any combination thereof, further including outputting, for display, a graphical user interface including the graphical representation of the object with the color.

Example 60. The method of examples 43-59 or any combination thereof, further including determining an electrical conductivity of the object based on the radar signals having the first polarization type reflected from the object and the radar signals having the second polarization type reflected from the object.

The disclosure contemplates computer-readable storage media comprising instructions to cause a processor to perform any of the functions and techniques described herein. The computer-readable storage media may take the example form of any volatile, non-volatile, magnetic, optical, or electrical media, such as a RAM, ROM, NVRAM, EEPROM, or flash memory. The computer-readable storage media may be referred to as non-transitory. A computing device may also contain a more portable removable memory type to enable easy data transfer or offline data analysis.

The techniques described in this disclosure, including those attributed to processing circuitry 120 and 220, display 230, transceiver circuitry 240, surveillance transponder 250, positioning device 260, radio 280, and/or memory 290, and various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, wherein the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices, such as between processing circuitry 120 and 220, display 230, transceiver circuitry 240, surveillance transponder 250, positioning device 260, radio 280, and/or memory 290. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein, including, but not limited to, processing circuitry 120 and 220, display 230, transceiver circuitry 240, surveillance transponder 250, positioning device 260, radio 280, and/or memory 290, may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

What is claimed is:

1. A radar device configured to detect an object, the radar device comprising:
   transceiver circuitry configured to transmit radar signals having a first polarization type towards the object, wherein the transceiver circuitry includes an antenna array configured to:
   receive radar signals having the first polarization type reflected from the object; and
   receive radar signals having a second polarization type reflected from the object, the second polarization type being different than the first polarization type; and
   processing circuitry configured to:
   interleave a first operating mode and a second operating mode;
   determine reflectivity values for the radar signals having the first polarization type reflected from the object in the first operating mode;
   determine reflectivity values for the radar signals having the second polarization type reflected from the object in the second operating mode; and
   determine a material category of the object based on the reflectivity values for the radar signals having the first polarization type reflected from the object and the reflectivity values for the radar signals having the second polarization type reflected from the object.

2. The radar device of claim 1, wherein the processing circuitry is configured to determine the material category at least in part by selecting the material category from a set of material categories including a conductive surface, vegetation, and a human.

3. The radar device of claim 1,
   wherein the processing circuitry is further configured to determine a power ratio of the radar signals having the first polarization type reflected from the object and the radar signals having the second polarization type reflected from the object, and
   wherein the processing circuitry is configured to determine the material category of the object based on the power ratio.

4. The radar device of claim 3, wherein the processing circuitry is configured to determine the material category of the object at least in part by:
   determining a conductive material category for the object in response to determining that the power ratio of the radar signals exceeds a first threshold ratio; and
   determining an insulative material category for the object in response to determining that the power ratio of the radar signals does is less than a second threshold ratio.

5. The radar device of claim 3, wherein the processing circuitry is further configured to associate a set of voxels with the object based on a power ratio of radar signals reflected from the set of voxels and further based on a Bayesian classifier algorithm.

6. The radar device of claim 1,
   wherein the processing circuitry is further configured to determine a phase relationship between the radar signals having the first polarization type reflected from the object and the radar signals having the second polarization type reflected from the object, and
   wherein the processing circuitry is configured to determine the material category of the object based on the phase relationship.

7. The radar device of claim 1, wherein the processing circuitry is configured to determine the material category of the object based on an algorithm including, as input variables:
   a power ratio of the radar signals having the first polarization type reflected from the object and the radar signals having the second polarization type reflected from the object; and
   a phase relationship between the radar signals having the first polarization type reflected from the object and the radar signals having the second polarization type reflected from the object.

8. The radar device of claim 1, wherein the antenna array comprises a second array of patch elements, and wherein the transceiver circuitry comprises:
   a circuit board;
   transmit circuitry including a first array of patch elements integrated into the circuit board and configured to transmit the radar signals having the first polarization type; and receiver circuitry including the second array of patch elements integrated into the circuit board and configured to:
  receive the radar signals having the first polarization type reflected from the object; and
  receive the radar signals having a second polarization type reflected from the object.

9. The radar device of claim 1,
  wherein the first polarization type comprises right-hand circular polarization, and
  wherein the second polarization type comprises left-hand circular polarization.

10. The radar device of claim 1, wherein the processing circuitry is configured to determine the material category at least in part by forming a beam at an intermediate frequency of the transceiver circuitry.

11. The radar device of claim 1, wherein the processing circuitry is further configured to:
  determine a color for a graphical representation of the object; and
  output, for display, a graphical user interface including the graphical representation of the object with the color.

12. The radar device of claim 1, wherein the processing circuitry is configured to determine an electrical conductivity of the object based on the radar signals having the first polarization type reflected from the object and the radar signals having the second polarization type reflected from the object.

13. A method for detecting an object, the method comprising:
  causing transceiver circuitry to transmit radar signals having a first polarization type towards the object;
  causing an antenna array of the transceiver circuitry to receive radar signals having the first polarization type reflected from the object;
  causing the antenna array of the transceiver circuitry to receive radar signals having a second polarization type reflected from the object, the second polarization type being different than the first polarization type;
  interleaving a first operating mode and a second operating mode;
  determining reflectivity values for the radar signals having the first polarization type reflected from the object in the first operating mode;
  determining reflectivity values for the radar signals having the second polarization type reflected from the object in the second operating mode; and
  determining a material category of the object based on the reflectivity values for the radar signals having the first polarization type reflected from the object and the reflectivity values for the radar signals having the second polarization type reflected from the object.

14. The method of claim 13, further comprising determining a power ratio of the radar signals having the first polarization type reflected from the object and the radar signals having the second polarization type reflected from the object,
  wherein determining the material category of the object is based on the power ratio.

15. The method of claim 13, further comprising determining a phase relationship between the radar signals having the first polarization type reflected from the object and the radar signals having the second polarization type reflected from the object, and
  wherein determining the material category of the object is based on the phase relationship.

16. A radar device configured to detect an object, the radar device comprising:
  transceiver circuitry configured to:
    transmit radar signals having a first polarization type towards the object;
    receive radar signals having the first polarization type reflected from the object; and
    receive radar signals having a second polarization type reflected from the object, the second polarization type being different than the first polarization type; and
  processing circuitry configured to:
    determine a power ratio of the radar signals having the first polarization type reflected from the object and the radar signals having the second polarization type reflected from the object;
    determine a material category of the object based on the power ratio at least in part by:
      determining a conductive material category for the object in response to determining that the power ratio of the radar signals exceeds a first threshold ratio; and
      determining an insulative material category for the object in response to determining that the power ratio of the radar signals does is less than a second threshold ratio.

17. The radar device of claim 16, wherein the processing circuitry is configured to determine the material category at least in part by selecting the material category from a set of material categories including a conductive surface, vegetation, and a human.

18. The radar device of claim 16,
  wherein the processing circuitry is further configured to determine a phase relationship between the radar signals having the first polarization type reflected from the object and the radar signals having the second polarization type reflected from the object, and
  wherein the processing circuitry is configured to determine a material category of the object based on the phase relationship.

19. The radar device of claim 16, wherein the processing circuitry is configured to determine the material category of the object based on an algorithm including, as input variables:
  the power ratio of the radar signals having the first polarization type reflected from the object and the radar signals having the second polarization type reflected from the object; and
  a phase relationship between the radar signals having the first polarization type reflected from the object and the radar signals having the second polarization type reflected from the object.

20. The radar device of claim 16, wherein the transceiver circuitry comprises:
  a circuit board;
  transmit circuitry including a first array of patch elements integrated into the circuit board and configured to transmit the radar signals having the first polarization type; and
  receiver circuitry including a second array of patch elements integrated into the circuit board and configured to:
    receive the radar signals having the first polarization type reflected from the object; and receive the radar signals having a second polarization type reflected from the object.

\* \* \* \* \*